United States Patent
Luan et al.

(10) Patent No.: US 10,437,480 B2
(45) Date of Patent: Oct. 8, 2019

(54) INTELLIGENT CODED MEMORY ARCHITECTURE WITH ENHANCED ACCESS SCHEDULER

(71) Applicant: Futurewei Technologies, Inc., Plano, TX (US)

(72) Inventors: Hao Luan, Plano, TX (US); Alan Gatherer, Richardson, TX (US); Sriram Vishwanath, Austin, TX (US); Casen Hunger, Austin, TX (US); Hardik Jain, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 539 days.

(21) Appl. No.: 14/955,966

(22) Filed: Dec. 1, 2015

(65) Prior Publication Data

US 2017/0153824 A1 Jun. 1, 2017

(51) Int. Cl.
*G06F 3/06* (2006.01)
*G06F 13/16* (2006.01)
*G06F 11/10* (2006.01)

(52) U.S. Cl.
CPC .......... *G06F 3/0611* (2013.01); *G06F 3/0659* (2013.01); *G06F 3/0683* (2013.01); *G06F 11/108* (2013.01); *G06F 13/161* (2013.01); *G06F 13/1642* (2013.01); *G06F 13/1647* (2013.01)

(58) Field of Classification Search
CPC ..... G06F 3/0611; G06F 3/0659; G06F 3/0683
See application file for complete search history.

(56) References Cited

U.S. PATENT DOCUMENTS

| | | | |
|---|---|---|---|
| 6,415,355 B1 | 7/2002 | Hirofuji | |
| 6,757,791 B1* | 6/2004 | O'Grady | H04L 49/90 370/412 |
| 6,877,077 B2* | 4/2005 | McGee | G06F 13/1642 710/39 |
| 8,775,868 B2 | 7/2014 | Colgrove et al. | |
| 8,799,743 B2 | 8/2014 | Resnick | |
| 2002/0007476 A1 | 1/2002 | Kishino | |
| 2002/0145934 A1 | 10/2002 | Uchida et al. | |

(Continued)

FOREIGN PATENT DOCUMENTS

| | | |
|---|---|---|
| CN | 1380698 A | 11/2002 |
| CN | 101132336 A | 2/2008 |

(Continued)

*Primary Examiner* — Ramon A. Mercado
(74) *Attorney, Agent, or Firm* — Slater Matsil, LLP

(57) ABSTRACT

A method, system, and architecture for efficiently accessing data in a memory shared by multiple processor cores that reduces the probability of bank conflicts and decreases latency is provided. In an embodiment, a method for accessing data in a memory includes determining, by a scheduler, a read pattern for reading data from memory to serve requests in a plurality of bank queues, the memory comprising a plurality of memory banks and a plurality of coding banks, the coding banks storing a coded version of at least some of the data stored in the plurality of memory banks; reading a first data from a first memory bank; reading coded data from one of the coding banks; and determining the second data according to the coded data and the first data.

25 Claims, 28 Drawing Sheets

(56) References Cited

U.S. PATENT DOCUMENTS

| | | | |
|---|---|---|---|
| 2004/0128428 A1* | 7/2004 | Christenson | G06F 13/161 711/5 |
| 2005/0091460 A1* | 4/2005 | Rotithor | G06F 13/1631 711/158 |
| 2007/0156946 A1 | 7/2007 | Lakshmanamurthy et al. | |
| 2007/0168700 A1 | 7/2007 | Dickenson et al. | |
| 2007/0168702 A1 | 7/2007 | Dickenson et al. | |
| 2008/0126682 A1 | 5/2008 | Zhao et al. | |
| 2009/0100225 A1 | 4/2009 | Matsuki | |
| 2009/0100236 A1 | 4/2009 | Puig | |
| 2009/0138670 A1 | 5/2009 | Mutlu et al. | |
| 2009/0300320 A1* | 12/2009 | Zhang | G06F 12/0862 711/213 |
| 2011/0022791 A1* | 1/2011 | Iyer | G06F 12/08 711/105 |
| 2011/0145638 A1 | 6/2011 | Syrgabekov et al. | |
| 2011/0179200 A1 | 7/2011 | Sukonik et al. | |
| 2011/0179240 A1 | 7/2011 | Sukonik et al. | |
| 2011/0238941 A1 | 9/2011 | Xu et al. | |
| 2012/0079318 A1 | 3/2012 | Colgrove et al. | |
| 2012/0084506 A1 | 4/2012 | Colgrove et al. | |
| 2012/0127818 A1* | 5/2012 | Levy | G06F 13/16 365/230.03 |
| 2012/0303905 A1 | 11/2012 | Zhang et al. | |
| 2013/0297907 A1* | 11/2013 | Ki | G06F 12/0684 711/170 |
| 2013/0346690 A1 | 12/2013 | Colgrove et al. | |
| 2014/0047197 A1 | 2/2014 | Kokrady et al. | |
| 2014/0059301 A1 | 2/2014 | Rao | |
| 2014/0177731 A1 | 6/2014 | Limberg | |
| 2014/0223223 A1 | 8/2014 | Akutsu | |
| 2014/0310482 A1 | 10/2014 | Iyer et al. | |
| 2016/0328158 A1 | 11/2016 | Bromberg et al. | |
| 2017/0031606 A1 | 2/2017 | Luan et al. | |
| 2017/0153824 A1 | 6/2017 | Luan et al. | |
| 2017/0315738 A1 | 11/2017 | Arsovski et al. | |

FOREIGN PATENT DOCUMENTS

| | | |
|---|---|---|
| CN | 101196857 A | 6/2008 |
| CN | 101436150 A | 5/2009 |
| CN | 101763437 A | 6/2010 |
| CN | 102460376 A | 5/2012 |
| CN | 103077123 A | 5/2013 |
| CN | 103339609 A | 10/2013 |
| EP | 2717186 A1 | 4/2014 |
| JP | S60108944 A | 6/1985 |
| JP | H11102326 A | 4/1999 |
| JP | H11327796 A | 11/1999 |
| JP | 2008192054 A | 8/2008 |
| JP | 2009098822 A | 5/2009 |
| JP | 2009237709 A | 10/2009 |
| JP | 2012059337 A | 3/2012 |
| JP | 2012507104 A | 3/2012 |
| JP | 2012513060 A | 6/2012 |
| JP | 2013513884 A | 4/2013 |
| JP | 2013539132 A | 10/2013 |
| JP | 2014521130 A | 8/2014 |
| KR | 20130104937 A | 9/2013 |
| WO | 0029959 A1 | 5/2000 |
| WO | 2010071655 A1 | 6/2010 |
| WO | 2010026366 A8 | 4/2011 |
| WO | 2014084855 A1 | 6/2014 |

* cited by examiner

INTELLIGENT CODED MEMORY ARCHITECTURE WITH ENHANCED ACCESS SCHEDULER

TECHNICAL FIELD

The present invention relates generally to a system and method memory access, and, in particular embodiments, to a system and method for an enhanced access scheduler for memory access in multi-core computer architectures.

BACKGROUND

Current general multi-core computer architectures include multiple cores connected to a shared memory controller. As shown in FIG. 1, a general multi-core architecture 100 with N processor cores 102 share a memory that includes M memory banks 110. Requests from each core 102 are sent to the memory controller 112 first, which then arbitrates with core arbitration unit 104 and in turn, issues requests to the memory. The memory controller is divided into three main parts: the core arbitration unit 104, bank queues 106, and an access scheduler 108. Because the memory controller 112 has parallel access to all M memory banks 110, a bank queue 106 is used for each individual bank request. These bank queues 106 are served every memory clock cycle and the acknowledgement with data (in the case of a read) is sent back to the processor 102.

In the scenario where multiple cores 102 request access to the memory locations which belong to the same bank 110, the memory controller 112 places these requests in the respective bank queues 106. The cores 102 may be central processing unit (CPU)/digital signal processing (DSP) cores, hardware accelerators or any master processor that can initiate read/write access to the memory. This contention between cores 102 to access the same bank 110 is known as a bank conflict. The bank conflicts mean that the requests will be served sequentially and that some of the cores 102 will have to wait longer for their request to execute. As the number of bank conflicts increase, the latency for memory accesses to the bank 110 increase, thereby increasing the latency for the entire system 100. Therefore, a new method, system, and architecture for improved memory access with decreased latency are desirable.

SUMMARY

In accordance with an embodiment, a method for reading data in a memory includes forming, by a scheduler, a read pattern for reading data from memory to serve requests in a plurality of bank queues, the memory comprising a plurality of memory banks and a plurality of coding banks, the coding banks storing a coded version of at least some of the data stored in the plurality of memory banks; reading, by the scheduler, a first data from a first memory bank; reading, by the scheduler, coded data from one of the coding banks; and determining, by the scheduler, the second data according to the coded data and the first data.

In accordance with an embodiment, a method in one or more master processors for accessing data in a memory includes selecting a first element and a second element from a write bank queue; writing the first element to a memory bank; and writing the second element to a coding bank as a coded memory element, writing the first element to the memory bank performed in parallel with the writing the second element to the coding bank.

In accordance with an embodiment, a data processing system includes one or more master processors and a non-transitory computer readable storage medium storing programming for execution by the processor, the programming including instructions to: form a read pattern for reading data from memory to serve requests in a plurality of read bank queues, the memory comprising a plurality of memory banks and a plurality of coding banks, the coding banks storing a coded version of at least some of the data stored in the plurality of memory banks; read a first data from a first memory bank; read coded data from one of the coding banks; and determine the second data according to the coded data and the first data.

In accordance with an embodiment, a processor includes a plurality of master core processors; a coded memory controller; and a memory comprising a plurality of memory banks and a plurality of coding banks, the coding banks comprising coded data of at least a part of the data in the memory banks, wherein the coded memory controller comprises a plurality of bank queues and an access scheduler, wherein the bank queues comprise a list of read requests and write requests; wherein the access scheduler searches the bank queues and schedules read operations from the memory such that a read operation from a memory bank corresponding to a first read request enables obtaining data from one of the coding banks that satisfies a second read request, and wherein the access scheduler obtains two entries from a write bank queue and writes a first entry to one of the memory banks and writes a second entry to one of the coding banks as a coded data entry.

An advantage of one or more embodiments is that dead cycles are reduced and access speed to memory is increased over prior art devices. Another advantage of one or more embodiments is that critical words are served more rapidly than prior art methods. Another advantage of one or more embodiments is that bank conflict between cores of a processor are reduced as compared to the prior art. These, as well as other, advantages will be apparent to those of ordinary skill in the art.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems, methods, and architectures for improving memory access by data processing systems. In an embodiment, extra redundancy for creating and storing data is enabled through the use of a few extra coding banks. In an embodiment, the coding banks store a coded copy of some or all of the data stored in the memory banks of a data processing system. An access scheduler creates an access pattern for reading and writing to the memory banks utilizing the coding banks to provide parallelization of memory requests for increased access rates. In embodiment, parallelization of memory requests from one bank to all the parallel banks as well as for requests from all the banks to all coding banks is provided. Embodiments of the disclosed systems, methods, and architectures decrease the likelihood of bank conflicts and provide higher access to particular banks as well as high access to the entire system.

Figure 1:
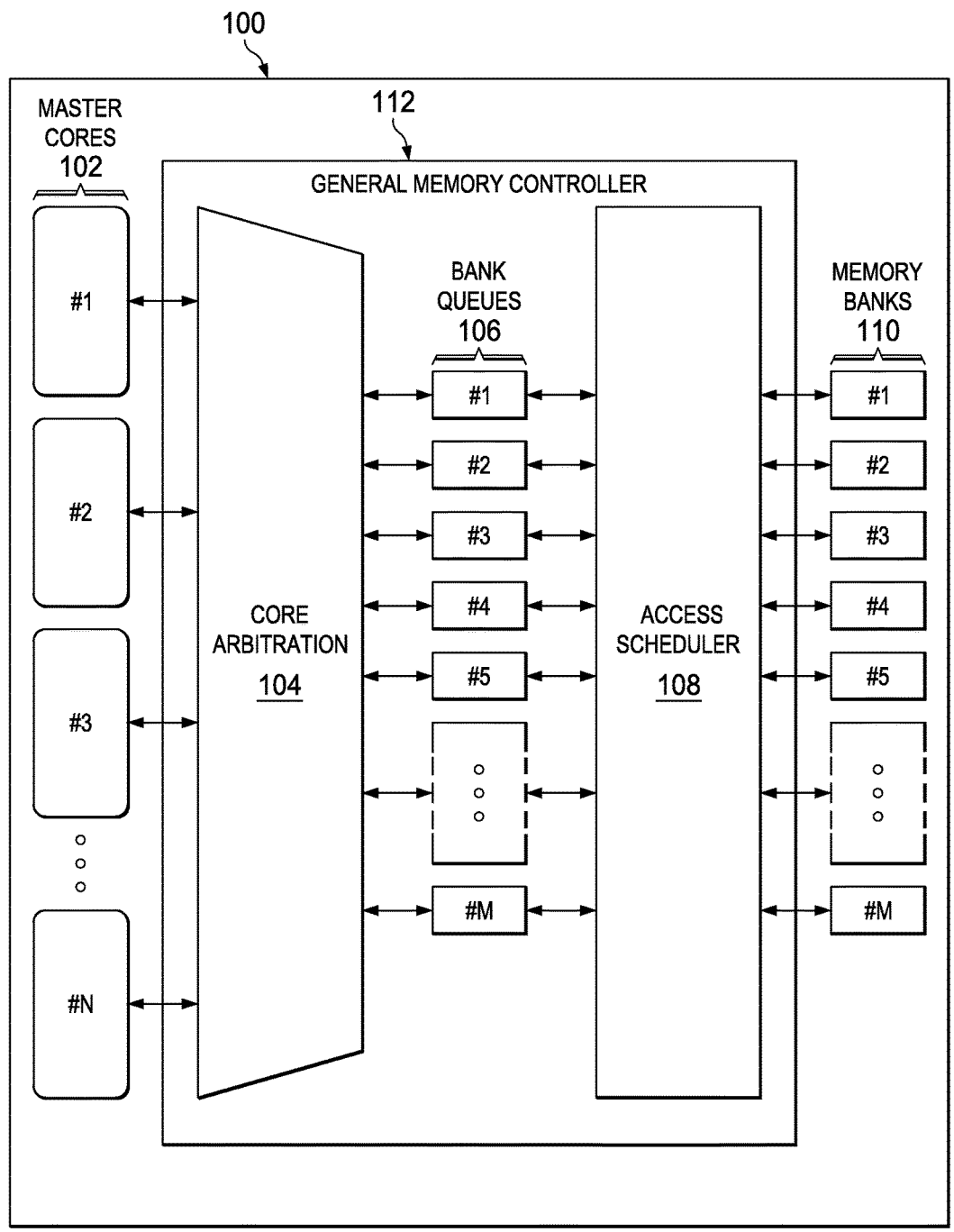
FIG. 1 is a block diagram of a prior art general multi-core architecture with a plurality of processor cores that share a memory that includes a plurality of memory banks.
Figure 2:
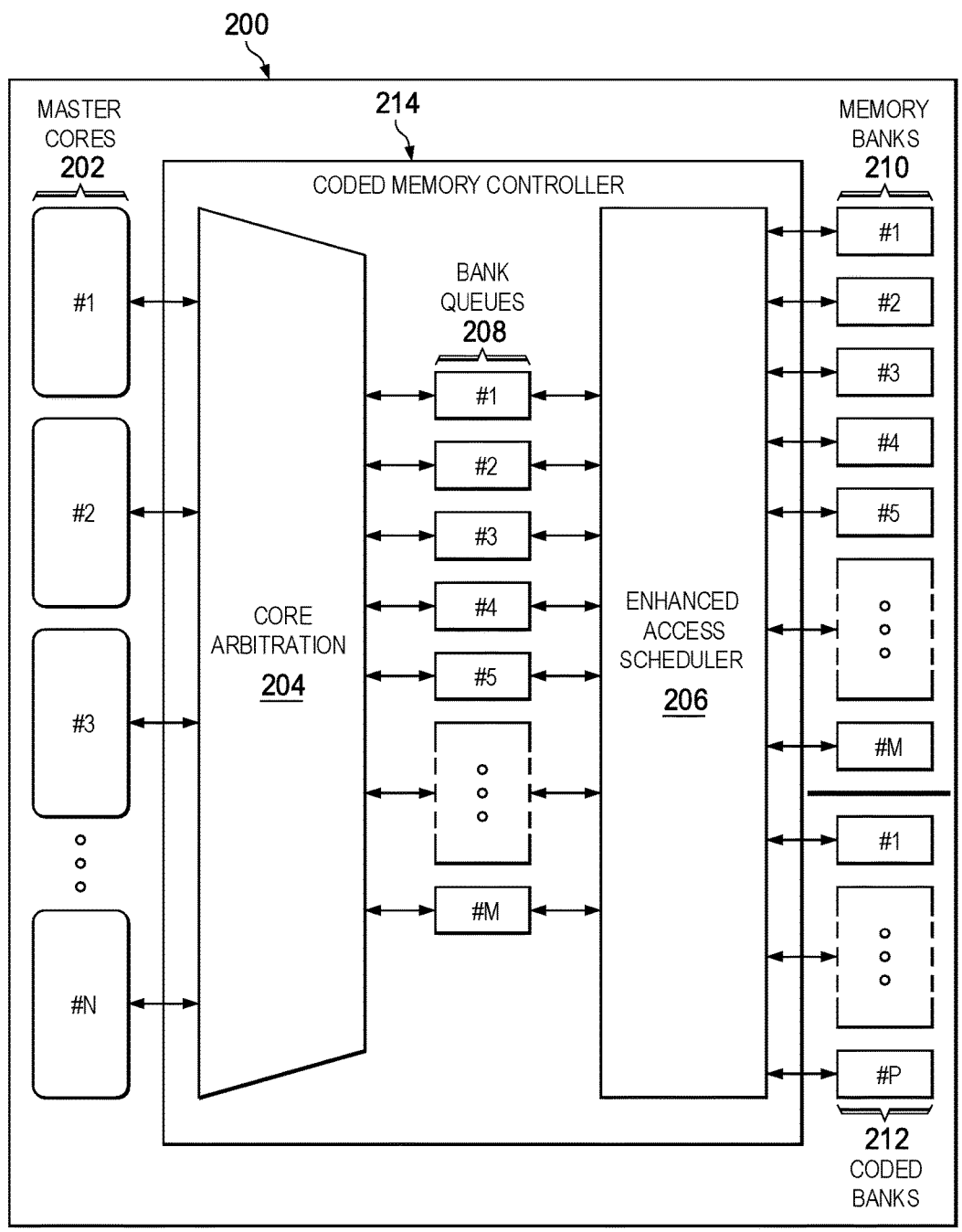
FIG. 2 is a block diagram of an embodiment of a multi-core processor system.

FIG. 2 is a block diagram of an embodiment of a multi-core processor system 200.

System 200 includes a plurality of cores 202 (labeled 1, 2, . . . , N), a coded memory controller 214, a plurality of memory banks 210 (labeled 1, 2, . . . , M), and a plurality of coding banks 212 (labeled 1, 2, . . . , P). The coded memory controller 214 is shared by all of the cores 202. The memory banks 210 and coding banks 212 are also shared by the cores 202.

In an embodiment, each core 202 is a processor. In an embodiment, the cores 202 can be other hosts such as a Direct Memory Access (DMA) controller. In some example embodiments, all of the cores 202 operate on a single chip and may be thought of as multiple cores of a single processor. In other example embodiments, these cores 202 may be located across multiple chips or circuits. Regardless of the architecture, access to memory banks 210 is controlled by a memory controller 214. It should be noted that in some example embodiments there are actually multiple memory controllers 214, where each memory controller 214 controls one or more memory banks.

In an embodiment, the cores 202 communicates with the shared memory controller 214 over an interconnect (not shown). The interconnect may be implemented with one or more busses, one or more networks (such as a packet-switched network), or some combination of busses and networks. The bus width of various busses in the interconnect may or may not be the same as the other busses. For example, some busses in the interconnect may be 128 bits wide, whereas others are 256 bits wide. Thus, one core 202 may communicate on a 128 bit bus, whereas another core 202 communicates on a 256 bit bus, as one example. In an embodiment, the coded memory controller 214 is directly connected to one or more of the cores 202. Also, the various busses and networks connecting the cores 202 to the coded memory controller 214 may observe the same or different protocols. In an embodiment, one or more of the cores 202 are configured with a point-to-point direct connection to the coded memory controller 214. This can help to achieve high performance when using embodiments of beat-level arbitration.

The cores 202, the memory banks 210, the coding banks 212, and the coded memory controller 214, can be clocked at a common frequency, or can be clocked independently. Also, the cores 202, the memory banks 210, the coding banks 212, and the coded memory controller 214, can be clocked synchronously or asynchronously. If clocked synchronously, the clock speeds for the memory banks 210, the coding banks 212, and the coded memory controller 214 are proportional to the clock speed for the cores 202. Additionally, each can be clocked at a different frequency, and with different clock phase if clocked asynchronously. For example, in one example embodiment, the cores 202 are clocked at a frequency F while the coded memory controller 214, the memory banks 210, and the coding banks 212 are clocked at ½ F. In another embodiment, the memory banks 210 and the coding banks 212 are clocked at ½ F, while the coded memory controller 214 is clocked at ¼ F. The clock speeds for a particular embodiment can be traded off between performance and power, as over-clocking a device generally wastes power and under-clocking introduces latency.

The coded memory controller 214 includes a core arbitration unit 204, a plurality of bank queues 208 (labeled 1, 2, . . . , M), and an enhanced access scheduler 206. The number, M, of bank queues 208 is equal to the number of memory banks 210. The number of cores 202 may or may not be equal to the number of memory banks, depending on the embodiment. The number of coding banks 212 may or may not be equal to the number of memory banks 210, depending on the embodiment.

The core arbitration unit 204 is responsible for interaction with the cores 202. The core arbitration unit 204 arbiters requests from the cores 202 and is responsible for all hand shaking between the cores 202 and the memory controller 214. It should be noted that while a single core arbitration unit 204 is depicted, in some embodiments there are a plurality of core arbitration units 204 that correspond to the number of banks/queues and in other embodiments there is one core arbitration unit 204 for reads and another core arbitration unit 204 for writes. In some embodiments, one corer arbitration unit 204 does both read and write arbitration together.

The bank queues 208 hold the requests to be served from a particular bank 210. The core arbitration unit 204 fills the bank queue 208 when it receives a request from the cores 202. In an example embodiment, each bank queue 208 corresponds to a particular memory bank 210. When an access to a particular memory bank (e.g., memory bank 210 labeled #1) is received, it is placed in the corresponding bank queue (e.g., bank queue 208 labeled #1) until it can be serviced. It should be noted that, while a single bank queue 208 corresponding to each memory bank 210 is shown in FIG. 2, in an embodiment, each bank queue 208 actually includes a read queue and a write queue or a combined read and write queue. In an embodiment, the read and write queue depends on the type of physical memory being used. The read queue holds requests to read from the corresponding memory bank 210, while the write queue holds requests to write to the corresponding memory bank 210.

Coding banks 212 store a coded copy of the data stored in the memory banks 210. This, combined with an enhanced access scheduler 206 improves the performance of the system 200 by, among other things, decreasing the latency for memory accesses from that observed in the prior art. The coding banks 212 are extra banks used to store copies of some (or all) of the data in the memory banks 210. In an example embodiment, these copies are stored in coded form using a specialized encoding scheme. The access scheduler 206 is designed to create an enhanced access schedule that utilizes the coding banks 212 to increase access efficiency. It should be noted that codes are generally stored in the coding banks 212 (separate from the memory banks 210). However, the codes can also be held in the memory banks 210 depending upon the coding scheme. In other words, in an embodiment there is a coding scheme where codes are stored in memory banks 210 and interleaved. Thus, in an embodiment, the notion of a coding bank 212 is a construct that could also be contained in a memory bank 210 using the proper coding scheme.

In an embodiment, each coding bank 212 is smaller than any of the memory banks 210. This leads to efficient use of the additional memory needed to utilize the coding banks 212, thus minimizing the amount of additional memory needed. This is in contrast to a solution that, for example, would simply provide an exhaustive coverage of every memory entry of every memory bank 210.

The access scheduler 206 forms an access pattern for each memory cycle. The access scheduler is responsible for the handshake between the memory controller 214 and the memory banks 210 as well as the coding banks 212. In an embodiment, for read requests, the access scheduler 206 accesses the bank queues 208 in order of their queue size with the smallest sized bank queue 208 accessed first for forming the access pattern. The access scheduler 206 attempts to form an optimal (or substantially optimal) pattern for reading from the memory banks 210 and coding banks 212. The access scheduler maintains a bitmap of availability of coding banks 212 and marks a coding bank 212 as busy when the access scheduler 206 assigns an access to be served from the respective bank. The access scheduler 206 searches the entire banks queues 208 in order to find a request which can be served from the coding banks 212. This enables the access scheduler 206 to maximize the chance of the last memory bank 210 being able to serve four read requests.

One benefit of this system 200 is that, by creating a parallel access to the memory banks 210 via the coding banks 212, the access rate to the data in the memory is increased. This backs parallelization of memory requests from one bank to all the parallel banks as well as for a request from all the memory banks 210 to all the coding banks 212. Thus, the coded system works against bank conflicts thereby providing higher access to a particular bank and also high access to the system 200 as a whole.

Figure 3:
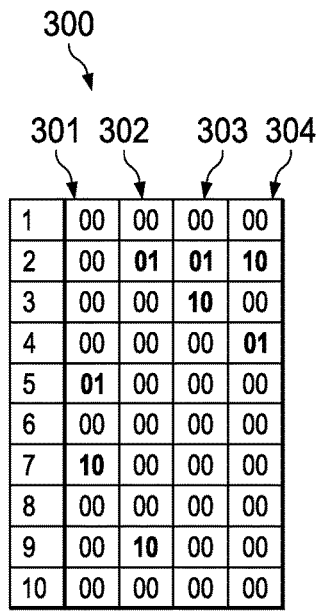
FIG. 3 is a block diagram of a memory for storing the status of the code for each row in the memory banks.

The access scheduler 206 includes a memory which holds the status of the code for each row in the memory banks. In an embodiment, the status of the code for each row in the memory banks is stored in memory outside the access scheduler 206. FIG. 3 is a block diagram of a code status memory 300 for storing the status of the code for each row in the memory banks. In the depicted example in FIG. 3, there are four memory banks with a corresponding column 301, 302, 303, 304 in the code status memory 300. Each row (1-10) corresponds to a row in one of the memory banks. For example, row 1, column 301 includes the entry "00", row 2, column 302 includes the entry "01", and row 3, column 303 includes the entry "10". The two digit codes in the entries of the memory 300 indicate the status of the coded memory in the coding banks 212 for the corresponding row and memory bank. Table 1 below shows the value of the bits and their meaning.

TABLE 1

| | Code Status Map |
|---|---|
| 00 | Codes are up-to-date |
| 01 | Codes are outdated. Fresh data in Data bank |
| 10 | Codes are outdated. Fresh data in Coding bank |
| 11 | Reserved |

Thus, for example, the code for row 1, column 301 (i.e., "00") indicates that data in the corresponding location in the coding banks 212 and memory banks 210 are up-to-date. The code for row 2, column 302 (i.e., "01") indicates that the codes are outdated and that fresh data is in the memory bank 210 while the corresponding data in the coding banks 212 is outdated. The code for row 3, column 303 (i.e., "10") indicates that the codes are outdated and that fresh data is in the corresponding location in the coding bank 212 while the data in the corresponding location in the memory bank is outdated.

For write requests, the access scheduler 206 schedules write to the memory banks 210 only when the bank queues 208 are full. This ensures that read requests receive priority over write requests, thereby decreasing the latency in the system. In an embodiment, two writes are performed per bank per cycle. This is achieved by using the coding banks 212 in the memory system. When a write is scheduled for a particular bank 210, the access scheduler 206 picks up two requests from the head of the corresponding bank queue 208. The access scheduler 206 writes the first request to the corresponding memory bank 210 and the second write is committed to the coding bank 212 of the respective row corresponding to the appropriate memory bank 210.

In an embodiment, each coding bank 212 is reserved for the efficient coding of existing data from a memory bank 210. Traditionally, when multiple accesses to a single memory bank 210 are issued by one or more of the cores 202, a stall is generated. These stalls are known as bank conflicts, and result from the fact that only one address from a particular memory bank 210 can be accessed at a time. In an example embodiment, the coding banks 212 are accessed concurrently with the corresponding memory banks 210 to help alleviate stalls from bank conflicts.

In an embodiment, the extra memory allocated as the coding banks 212 is limited to 15% of overall memory, as a function of the coding scheme, including the coding banks 212 and the memory banks 210. This allows it to be compared with the average two port memory's area and logic overhead.

The precise functioning of the encoding of the coding banks 212 may vary based on the memory bank 210 size and the coding bank 212 size.

In an embodiment, an Exclusive OR (XOR) function is used to store data in the coding banks 212. This acts to reduce complexity overhead and preserve the linearity of codes. Linear codes offer the widest range of functionality because any order of the codes may be used to either encode or decode. The lack of dependency allows the design to use the coding banks 212 in the most flexible way possible. Additionally, in an example embodiment, different weights can be assigned to the memory elements for the XOR function. For example, memory elements $a_0$ and $b_0$ could be stored as $\alpha a_0 + \beta b_0$ for integer values $\alpha$ and $\beta$ which belong to any Galois field. Another design consideration could be the compression factor to generate the codes. The XOR can be performed on 2 or more memory elements, and thus the greater the number of memory elements that the XOR is performed on, the greater the compression factor (and the greater the complexity in decoding the code). For example, suppose there are four memory banks A, B, C, and D, holding elements $a_0$ to $a_n$, $b_0$ to $b_n$, $c_0$ to $c_n$, and $d_0$ to $d_n$, respectively. The possible codes corresponding to these elements in the coding banks could be $a_i+b_i$; $b_i+c_i$; $c_i+d_i$; and $c_i+a_i$ for i=0 to n.

It should be noted that the "+" sign as used herein means to perform one or more functions in conjunction with the one or more data involved.

This scheme uses a combination of 2 memory elements to generate the codes. Although this uses 100% extra memory overhead, it also enables 100% extra memory accesses per cycle (i.e. 4 extra accesses). Another design could be to compress the codes by combining all 4 memory elements to generate the codes:

$a_i+b_i+c_i+d_i$ for i=0 to n.

This design gives one extra access per cycle at the cost of 25% memory overhead. However, the decoder here needs to obtain 3 elements in order to be able to decode the 4th element. So although more data could be coded in a single memory location, this compression comes with the cost of additional access time and complexity. The scheme described above "codes" the coding banks 212 using elements from different memory banks 210. This may be called "Interbank Coding." In an example embodiment, an orthogonal way of coding is provided called "Intrabank Coding," where memory elements from the same banks are used to generate codes. Additionally, in other embodiments, both Interbank and Intrabank Coding are used.

Figure 4:
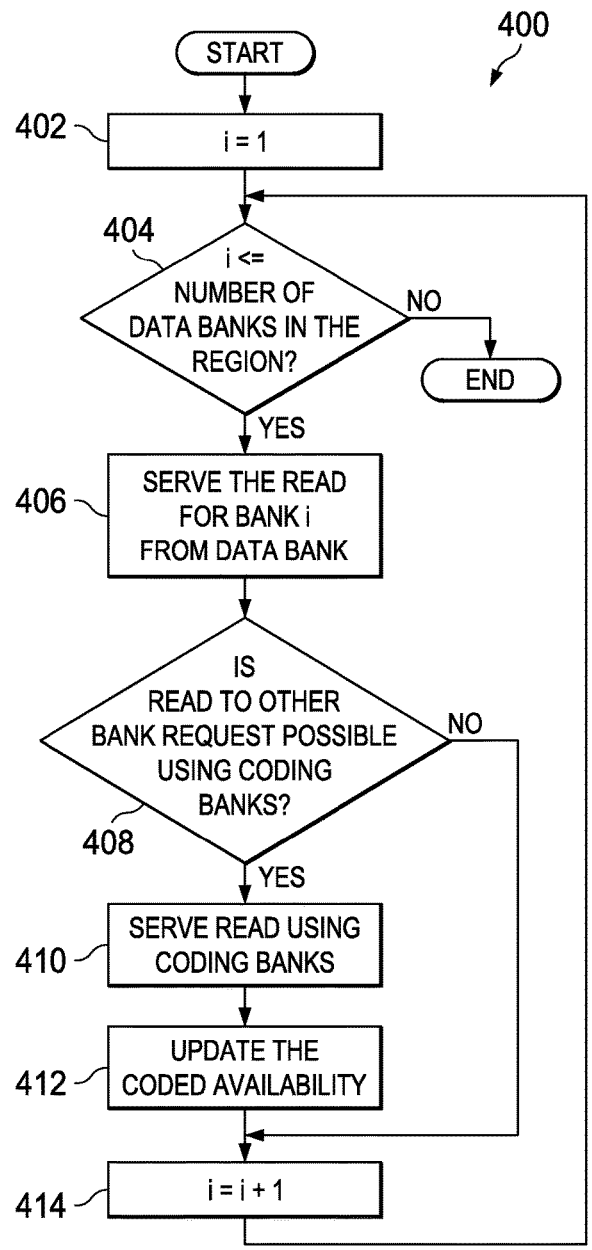
FIG. 4 is a flowchart of an embodiment of a method for reading data from memory.

FIG. 4 is a flowchart of an embodiment of a method 400 for reading data from memory. One goal of the method 400 is to substantially maximize the read accesses per cycle in all scenarios. In an embodiment, the method 400 may be executed by the access scheduler 206 in FIG. 2. The method 400 uses the redundancy in the coding bank 212 in order to server more accesses. In an embodiment, the accesses from the coding banks are useful only if one of the corresponding accesses is made to the memory bank 210. The method 400 begins at block 402 where a counter, i, is set equal to 1. At block 404, the method 400 determines whether the counter, i, is less than or equal to the number of data banks in the region. If, at block 404, the counter, i, is not less than or equal to the number of data banks in the region, then the method 400 ends. If, at block 404, the counter, i, is less than or equal to the number of data banks in the region, then the method 400 proceeds to block 406 where a read is served for bank i from the corresponding memory bank 210. At block 408, the method 400 determines if it is possible to serve a read to another bank request using coding. If, at block 408, it is not possible to serve a read to another bank request using coding, then the method proceeds to block 414 where the counter, i, is incremented by 1 and the method proceeds back to block 404. If, at block 408, it is possible to serve a read to another bank request using coding, then the method 400 proceeds to block 410 where a read to another bank request is served using coding. At block 412, the coding availability is updated and the method 400 proceeds to block 414.

Figure 5:
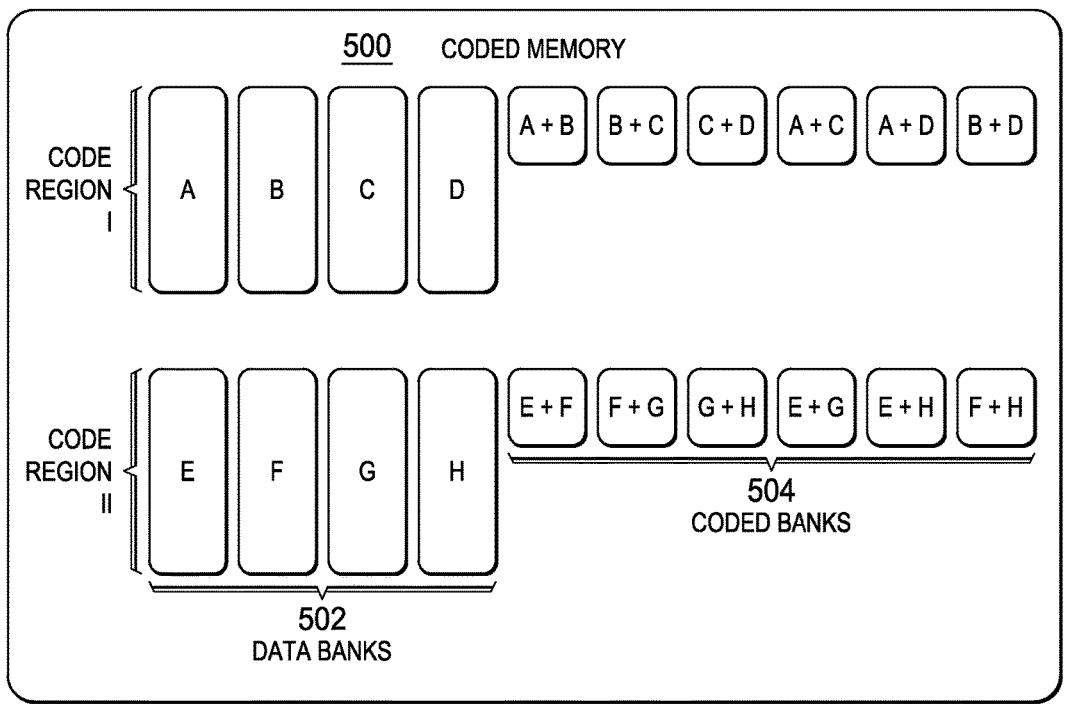
FIG. 5 is a block diagram of an embodiment of a coded memory.

FIG. 5 is a block diagram of an embodiment of a coded memory 500. Coded memory 500 may be implemented as, for example, the memory banks 210 and coding banks 212 in FIG. 2. The coded memory 500 includes a plurality of data banks 502 and a plurality of data banks 504 arranged into code region I and code region II. The data banks 502 may be implemented as memory banks 210 and the coding banks 504 may be implemented as the coding banks 212 in FIG. 2. The data banks 502 in code region I are labeled A, B, C, and D. The data banks 502 in code region II are labeled E, F, G, and H. The coding banks 504 for region I include a coding bank that codes for the contents of memory banks A and B, one for memory banks B and C, one for memory banks C and D, one for memory banks A and C, one for memory banks A and D, and one for memory banks B and D. Similarly, the coding banks 504 for region II included a coding bank that codes for the contents of memory banks E and F, one for memory banks F and G, one for memory banks G and H, one for memory banks E and G, one for memory banks E and H, and one for memory banks F and H. If, for example, a read to a specific row of memory bank A is made, then a read to the corresponding row of the coding bank for A and B can be made from which the content of the corresponding row of memory bank B can be determined without reading from memory bank B. The read to the memory bank 502 and the coding bank 504 can be made in parallel. Furthermore, the contents of the corresponding row of memory bank C can be determined by reading from the coding bank that codes for A and C and, the contents of the corresponding row of memory bank D can be determined by reading from the coding bank that codes for A and D.

Figure 6A:
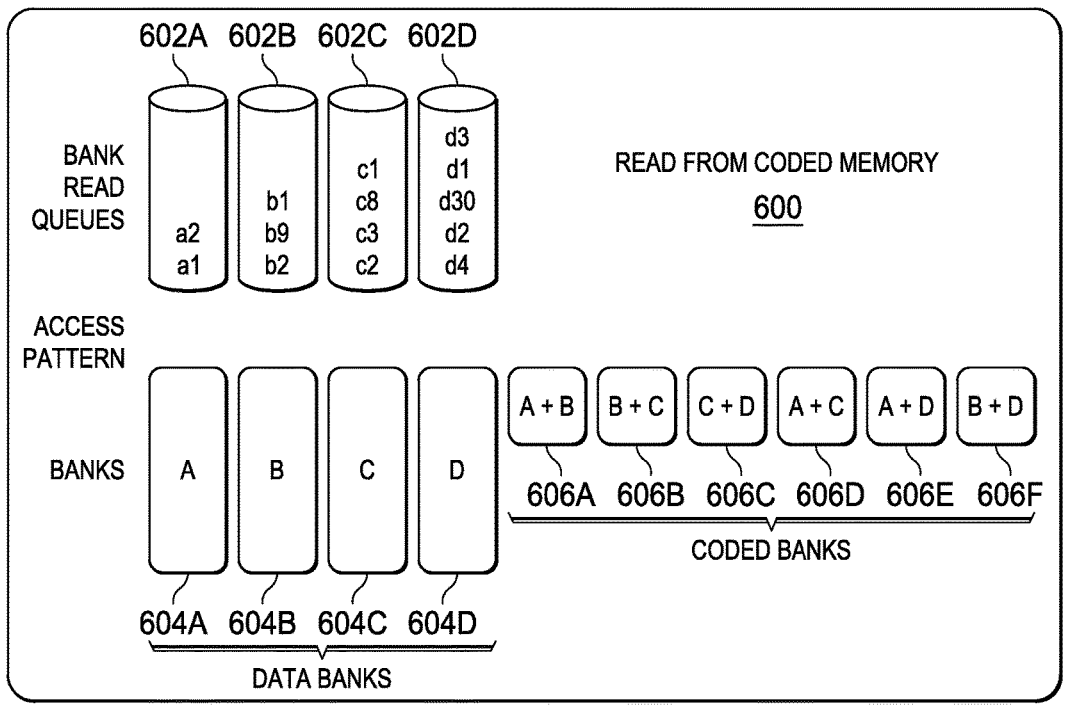
FIGS. 6A-6U describes an embodiment access pattern scenario for a processor and memory system.
Figure 6B:
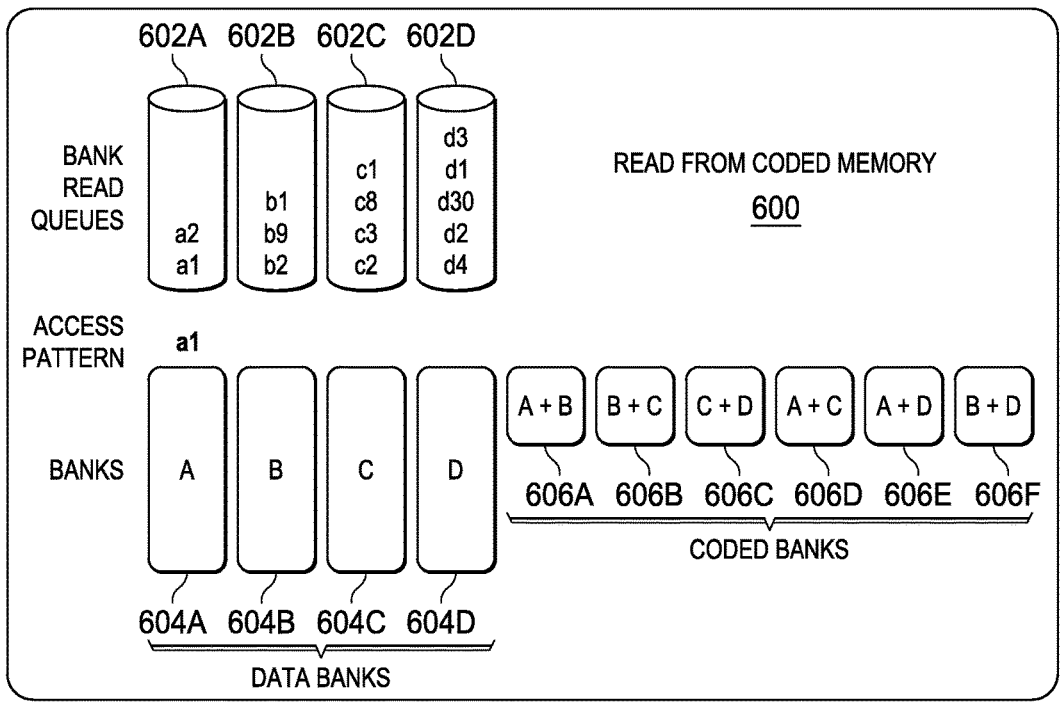
Figure 6C:
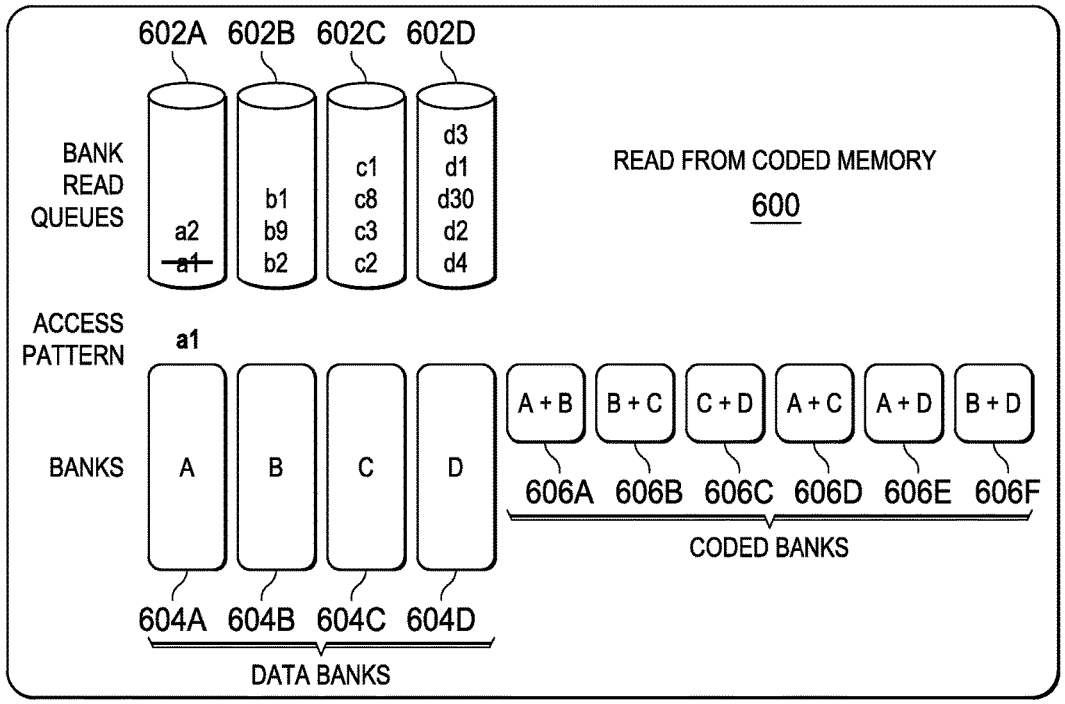
Figure 6D:
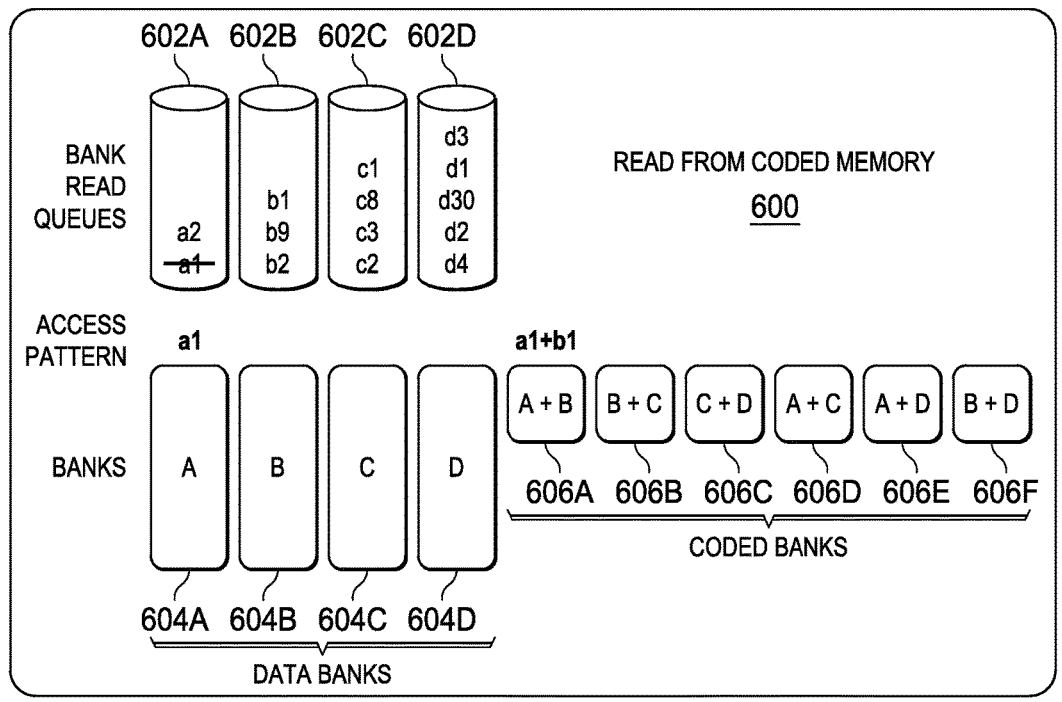
Figure 6E:
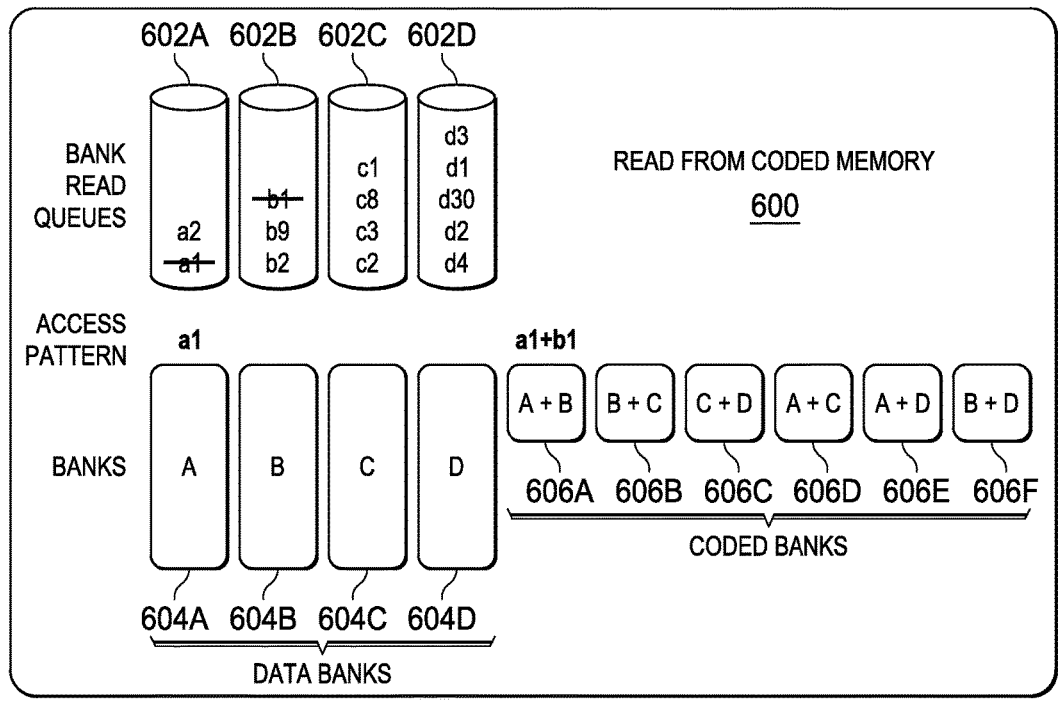
Figure 6F:
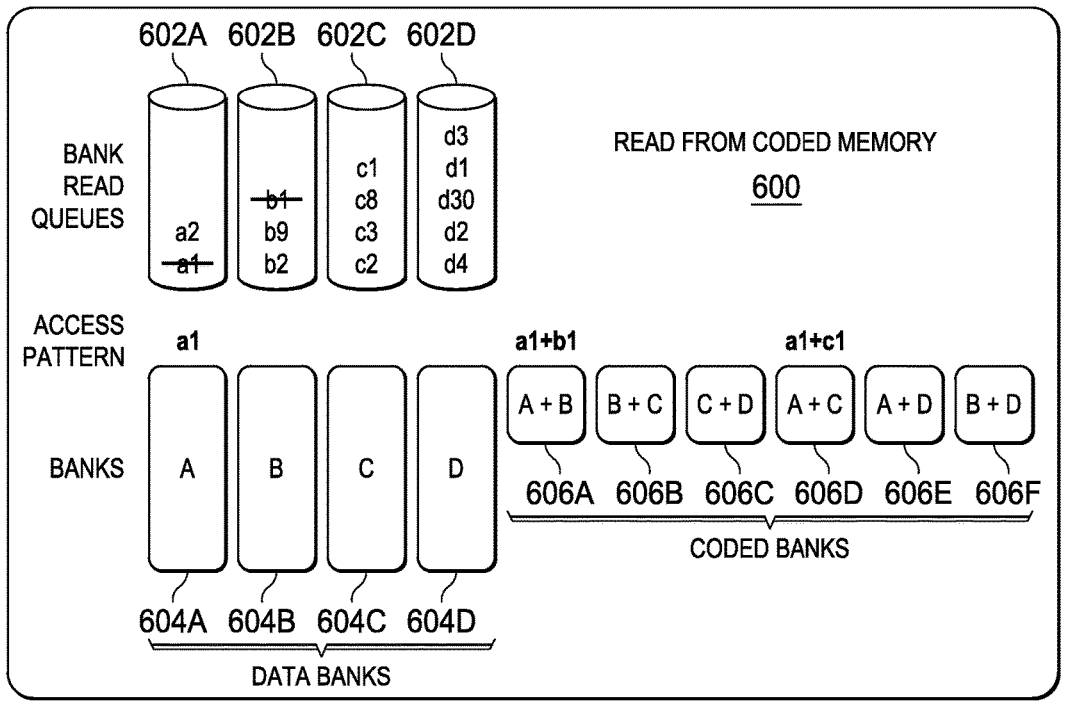
Figure 6G:
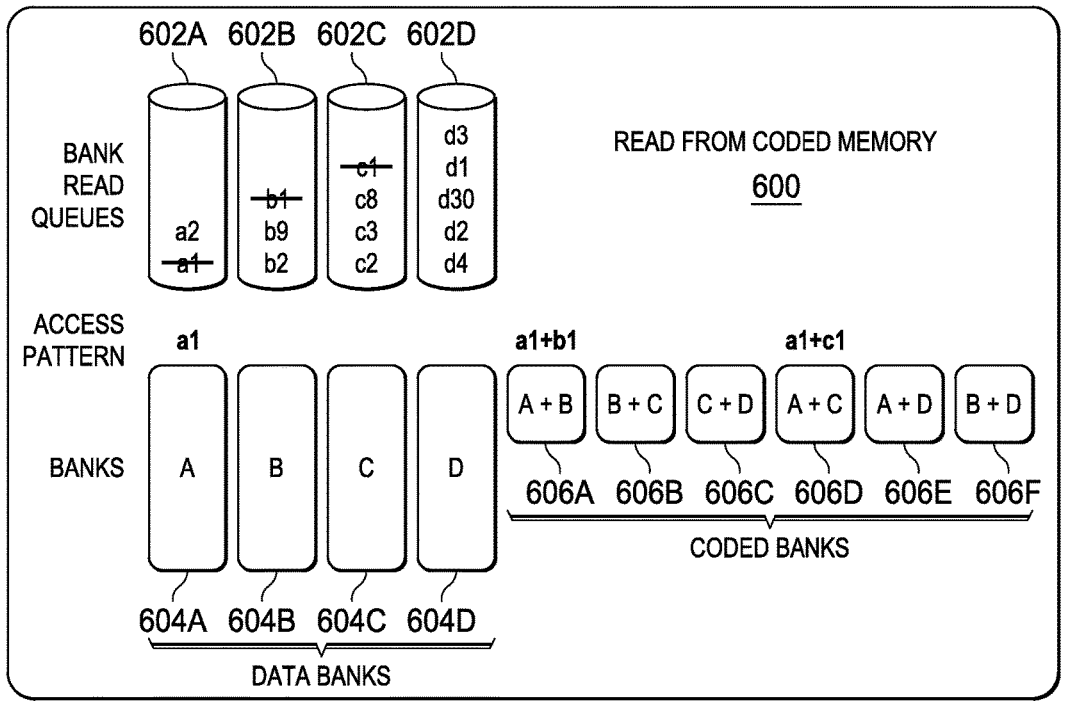
Figure 6H:
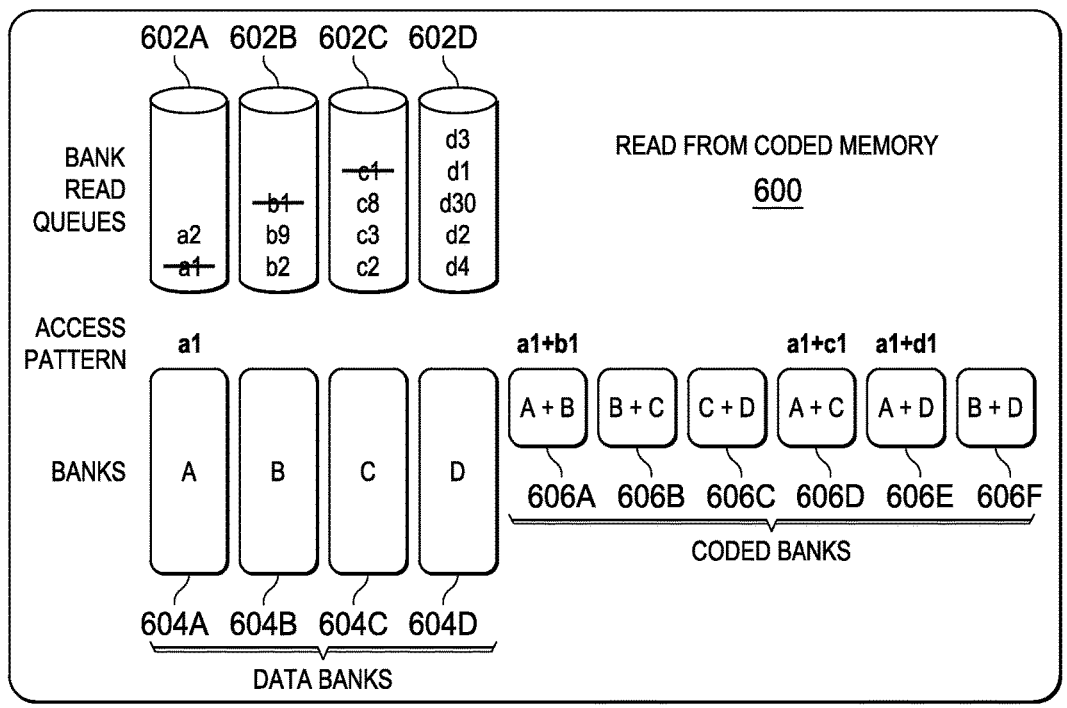
Figure 6I:
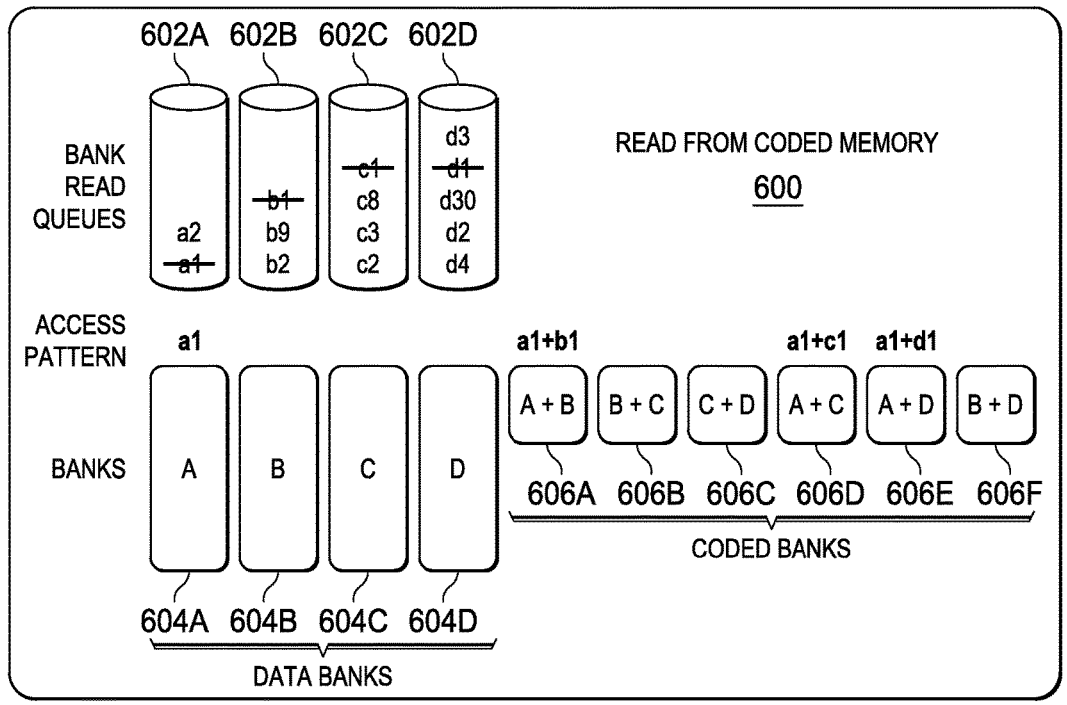
Figure 6J:
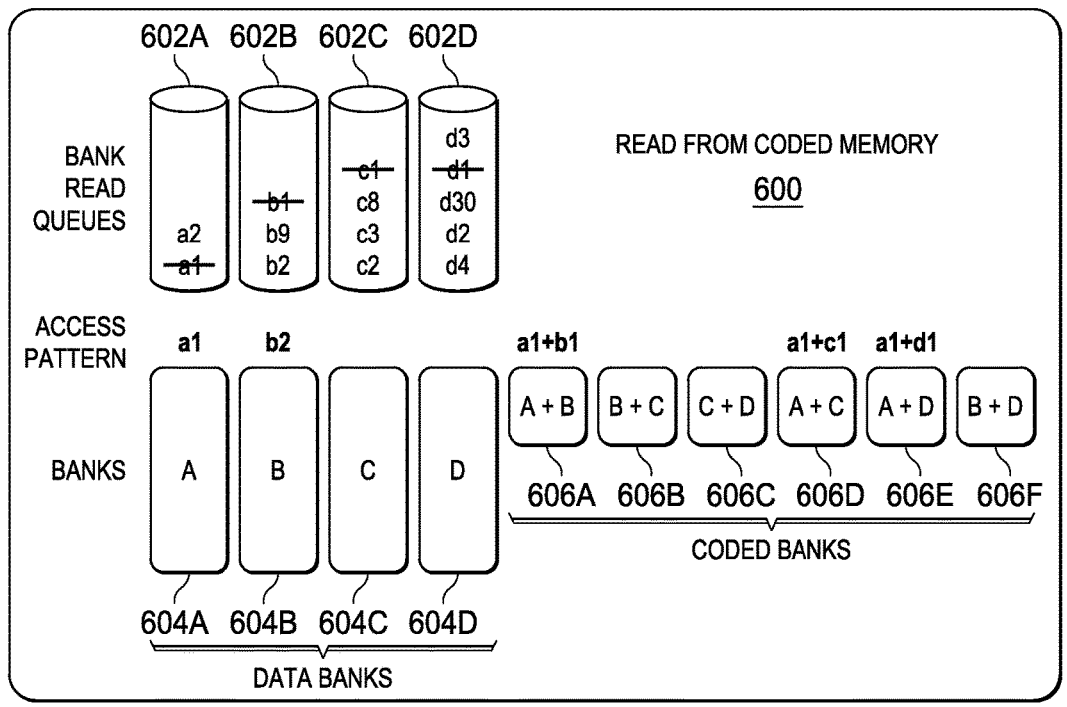
Figure 6K:
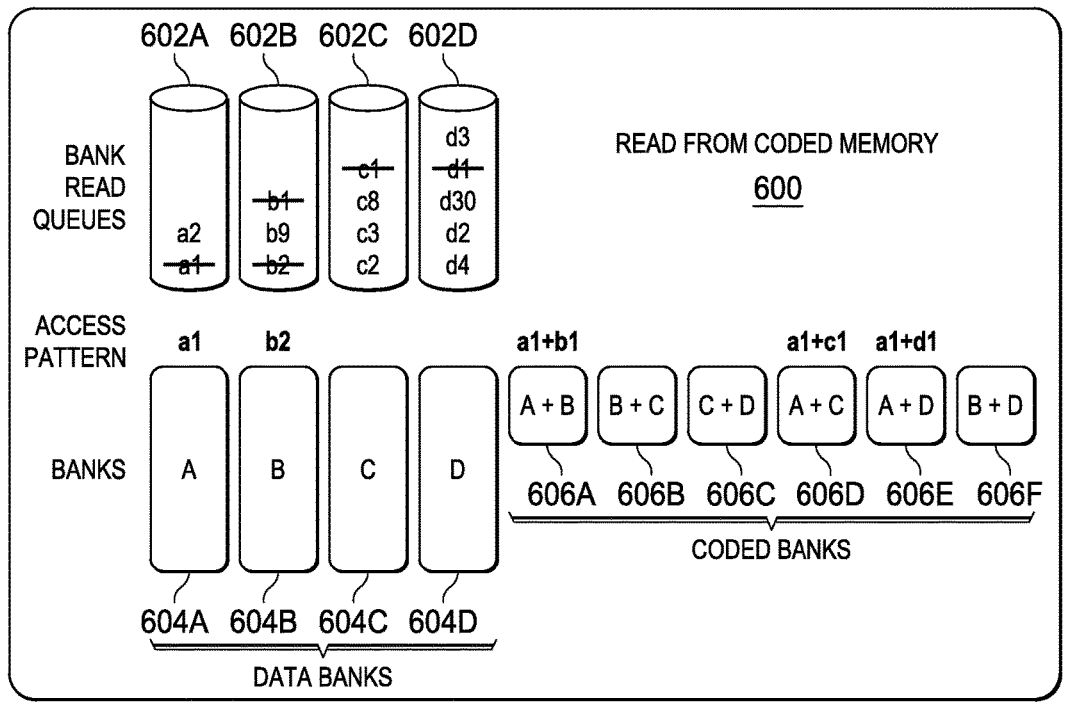
Figure 6L:
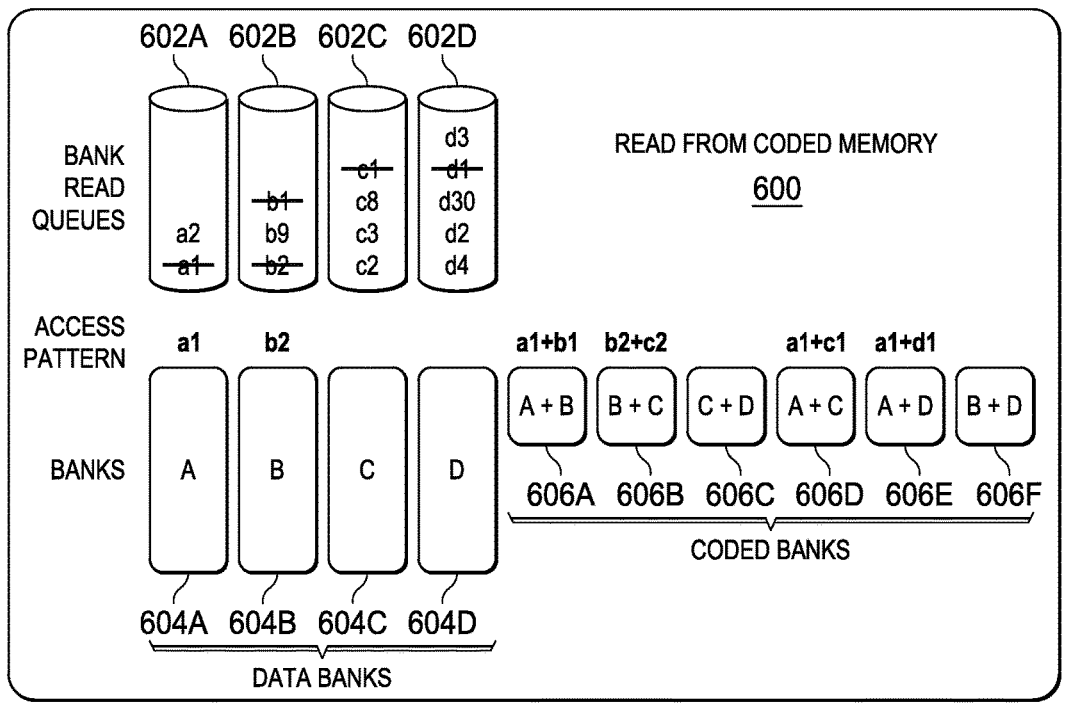
Figure 6M:
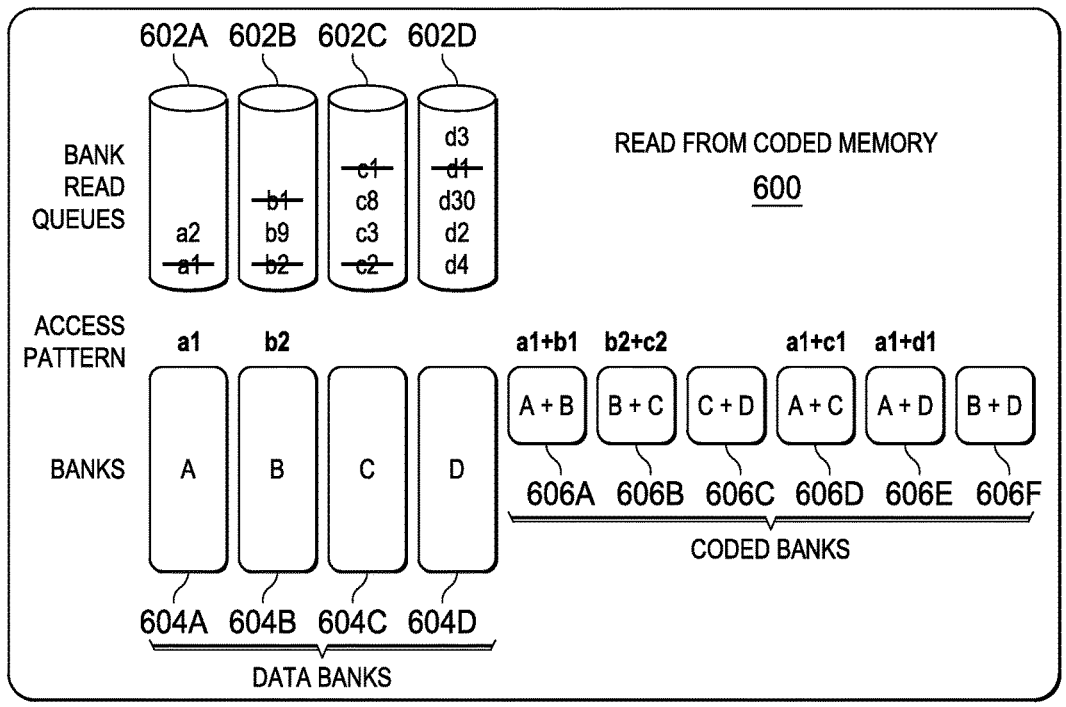
Figure 6N:
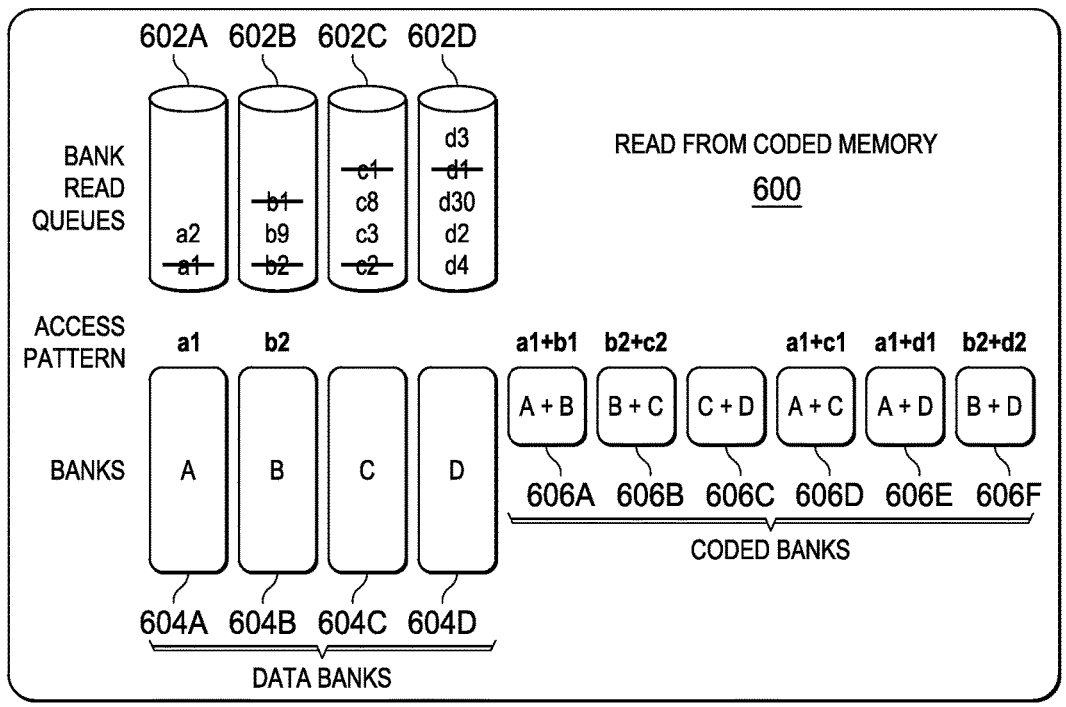
Figure 6O:
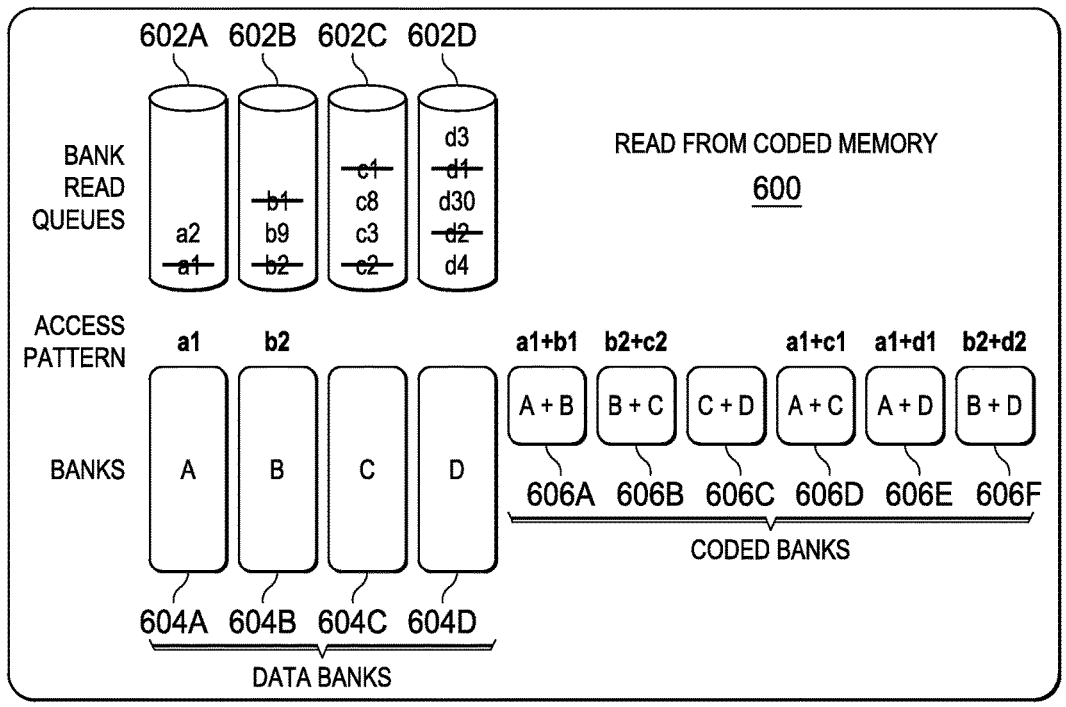
Figure 6P:
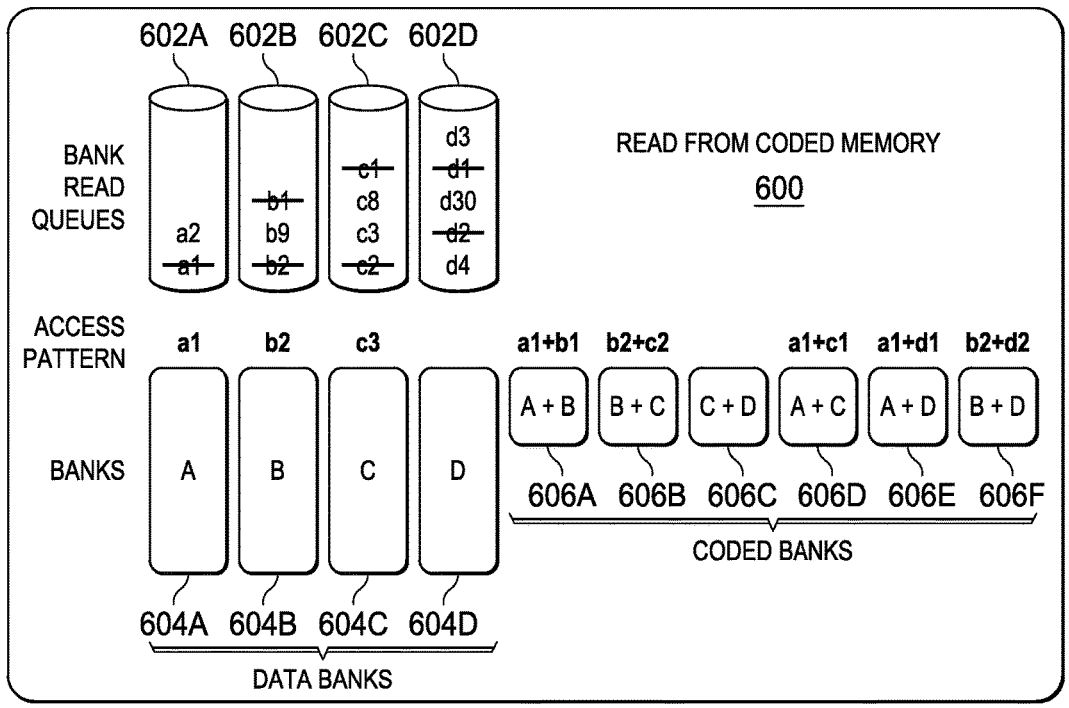
Figure 6Q:
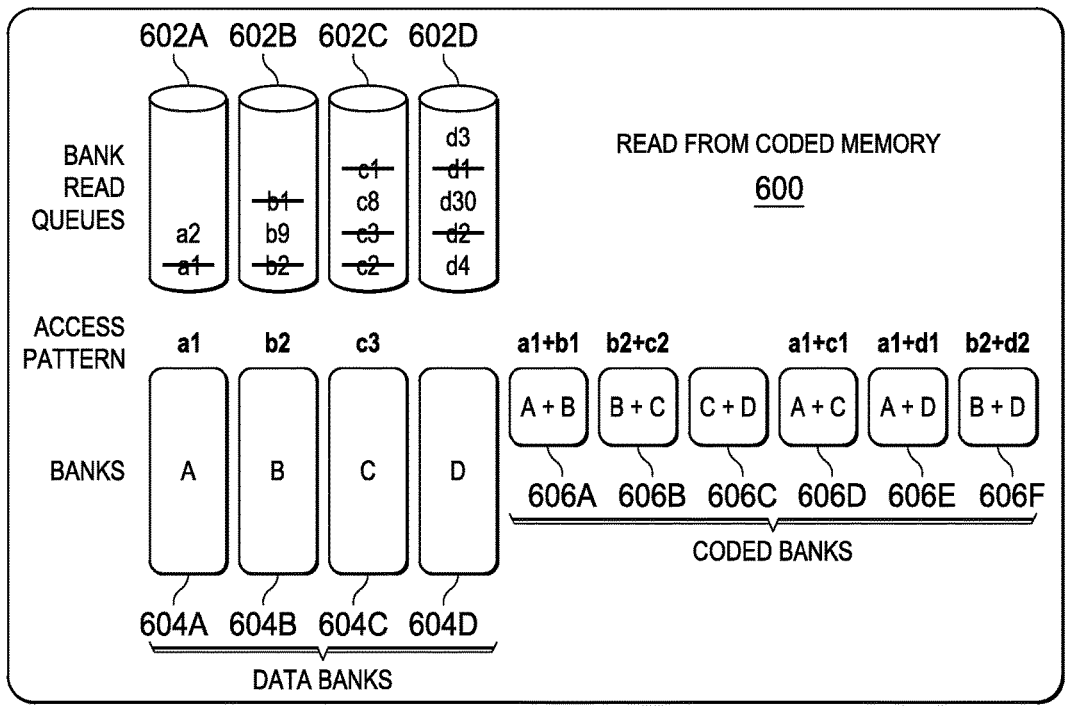
Figure 6R:
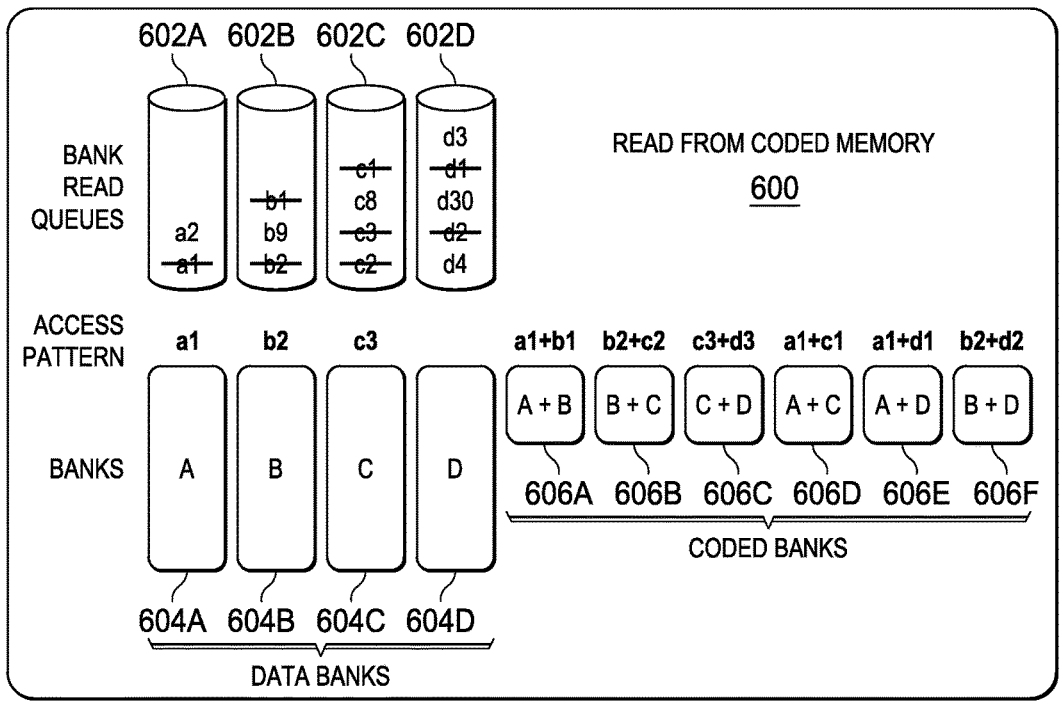
Figure 6S:
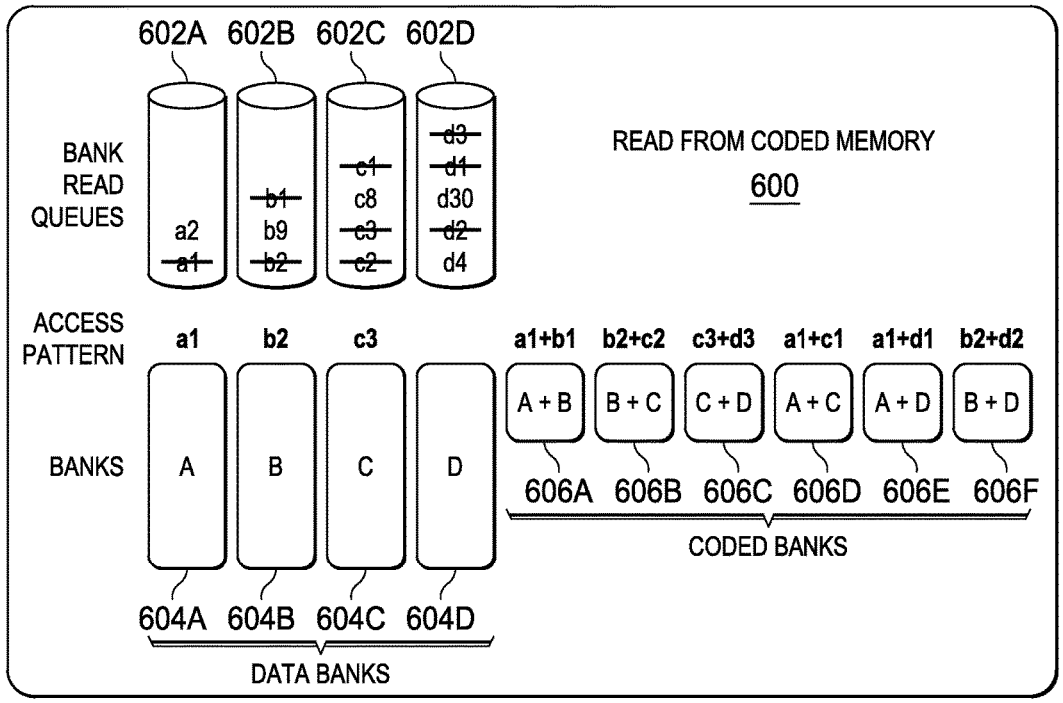
Figure 6T:
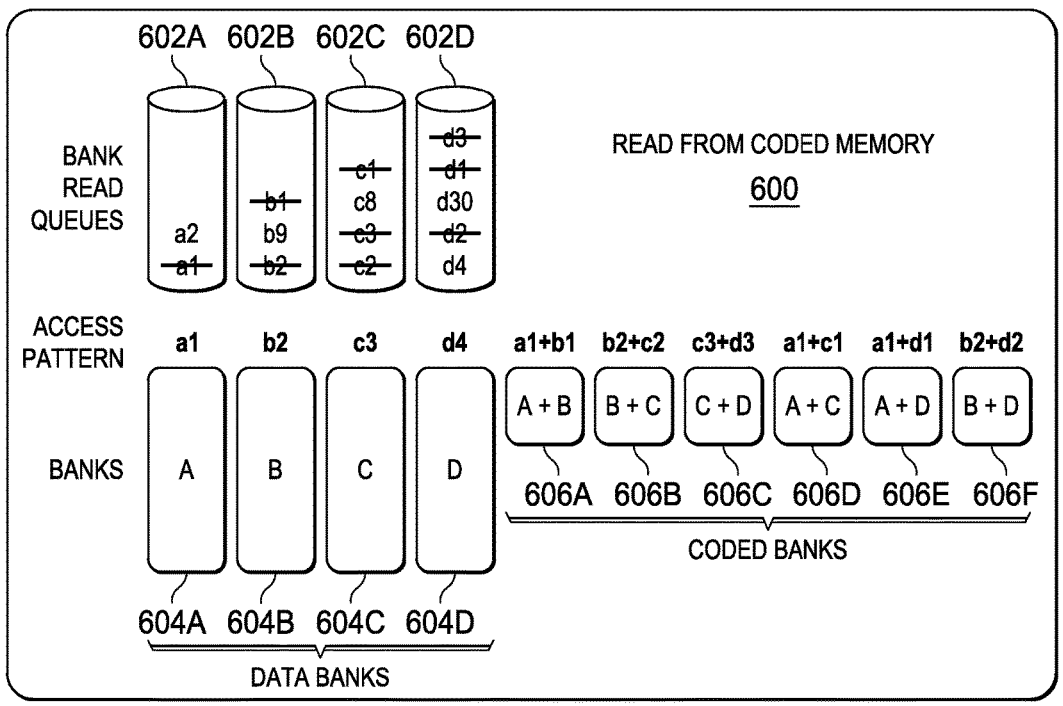
Figure 6U:
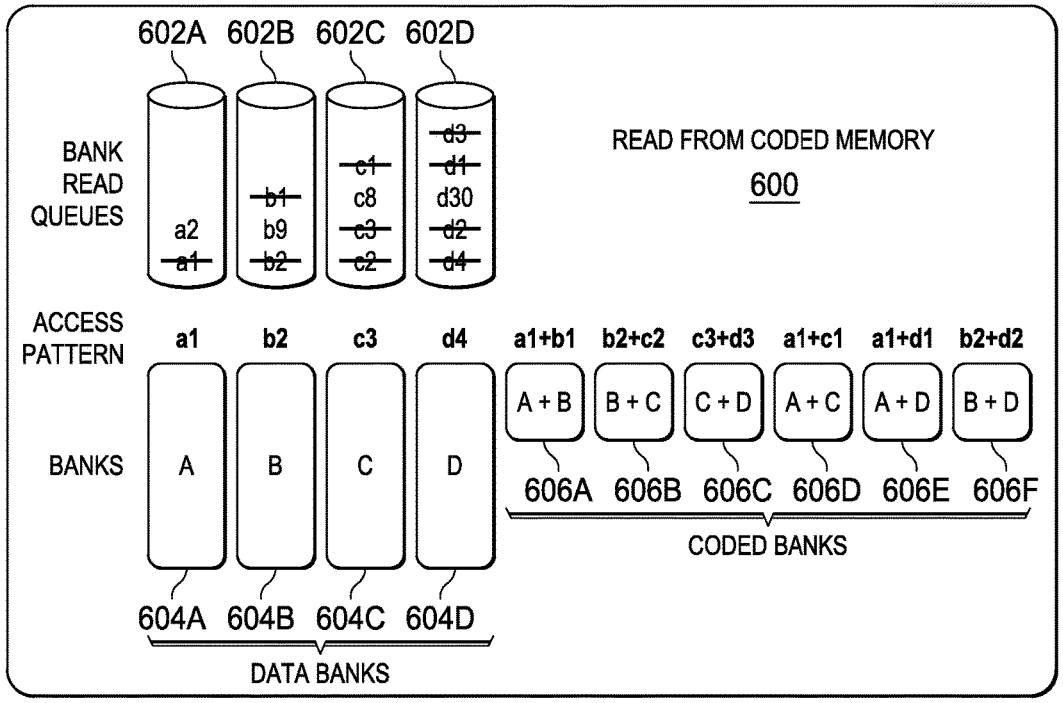

FIGS. 6A-6U describes an embodiment access pattern scenario for a system 600. System 600 includes a plurality of bank read queues 602A, 602B, 602C, 602D, a plurality of data banks 604A, 604B, 604C, 604D, and a plurality of coding banks 606A, 606B, 606C, 606D, 606E, 606F. Although depicted as four data banks 604, those of ordinary skill in the art will recognize that the disclosed systems and methods apply to a memory that includes any number of data banks. In an embodiment, the bank read queues 602A, 602B, 602C, 602D may be implemented as bank queues 208 in FIG. 2. In an embodiment, the data banks 604A, 604B, 604C, 604D may be implemented as the memory banks 210 in FIG. 2. In an embodiment, the coding banks 606A, 606B, 606C, 606D, 606E, 606F may be implemented as the coding banks 212 in FIG. 2. The reads are maximized by using the coding banks 606A, 606B, 606C, 606D, 606E, 606F. In an embodiment, one key is to be able to use the coding banks 606A, 606B, 606C, 606D, 606E, 606F to serve the reads to other memory banks 604A, 604B, 604C, 604D. Bank read queue 602A includes read requests for data from data bank 604A; bank read queue 602B includes read requests for data from data bank 604B; bank read queue 602C includes read requests for data from data bank 604C; and bank read queue 602D includes read requests for data from data bank 604D. In the depicted example, as shown in FIG. 6A, the bank read queue 602A includes a request for a1 (i.e., a read from the first row of memory bank A 604A) and a request for a2. The bank read queue 602B includes requests for b2, b9, and b1. The bank read queue 602C includes requests for c2, c3, c8, and c1. The bank read queue 602D includes requests for d4, d2, d30, d1, and d3.

In an example process of determining an access pattern for read requests, the memory controller (or access scheduler in the memory controller) first marks a1 to be read from data bank A as indicated in FIG. 6B. The memory controller then iterates through banks B 602B, C, 602C, and D 602D to find out if any read requests can be served from the coding banks 606. Thus, in the depicted example, the scheduler determines that b1, c1, and d1 can be served using the coding banks 606. The scheduler marks the corresponding coding banks 606A, 606D, 606E to be busy. In FIG. 6C, a line has been drawn through the request for a1 in the bank read queue 602A to indicate that a1 has been scheduled. As depicted in FIG. 6D, a1+b1 can be read from coding bank 606A in order to provide serve the request for b1. Thus, in FIG. 6E, a line has been drawn through the request for b1 in the bank read queue 602B to indicate that a read of b1 has been scheduled. It should be noted that b1 is not the first request in the bank read queue 602B. In FIG. 6F, a read of coding bank 606D is scheduled from which the request for c1 can be served. Thus, in FIG. 6G, a line has been drawn through the request for c1 in the bank read queue 602C to indicate that the request for c1 has been scheduled. In FIG. 6H, a read of coding bank 606E is scheduled from which the request for d1 can be served. Thus, in FIG. 6I, a line has been drawn through the request for d1 in the bank read queue 602D to indicate that the request for d1 has been scheduled.

Next, the controller schedules b2 to be read from data bank 604B as shown in FIG. 6J. The controller serves c2 and d2 from the coding banks 606 since they are available. Thus, in FIG. 6K, a line has been drawn through the request for b2 in the bank read queue 602B to indicate that the request for b2 has been scheduled. In FIG. 6L, a read of coding bank 606B is scheduled from which the request for c2 can be served. Thus, in FIG. 6M, a line has been drawn through the request for c2 in the bank read queue 602C to indicate that the request for d2 has been scheduled. In FIG. 6N, a read of coding bank 606F is scheduled from which the request for d2 can be served. Thus, in FIG. 6O, a line has been drawn through the request for d2 in the bank read queue 602D to indicate that the request for d1 has been scheduled.

Next, as shown in FIG. 6P, the controller schedules the request for c3 to be served from data bank 604C. The controller serves d3 from the coding banks 606 since it is available. Thus, in FIG. 6Q, a line is drawn through the request for c3 to indicate that the read of c3 in bank read queue 602C has been scheduled. In FIG. 6R, a read of coding bank 606C is scheduled from which the request for d3 can be served. Thus, in FIG. 6S, a line has been drawn through the request for d3 in the bank read queue 602D to indicate that the request for d3 has been scheduled.

Next, as shown in FIG. 6T, the controller schedules the request for d4 to be served from data bank 604D. Thus, in FIG. 6U, a line is drawn through the request for d4 to indicate that the read of d4 in bank read queue 602D has been scheduled.

As can be seen in FIG. 6U, after a complete access pattern (for one cycle) has been scheduled, the controller serves four requests from bank read queue 602D (i.e., the largest bank read queue 602 since it contains five requests—as opposed to two, three, and four respectively for the other bank read queues 602, 602B, 602C. The bank read queues 602 are thus accessed in order of their queue size with the smallest queue size (i.e., bank read queue 602A) accessed first for forming the access pattern. However, this rule does not guarantee that there will be one access to the first bank and four accesses to the last bank. This is dependent on the accesses in the bank read queues 602.

The example illustrated in the paragraphs above describing FIGS. 6A-6U highlight three different aspects of an embodiment of the disclosed read algorithm. First, the access scheduler attempts to form the most optimum pattern for read. The accesses from the other bank queues 602 are searched. The controller maintains a bitmap of availability of coding banks 606 and marks them busy when the scheduler assigns an access to be served from a respective coding bank 606. Second, the scheduler has the ability to search in the whole queue 602 in order to find a request which can be served from the coding banks 606. Third, the scheduler accesses bank queues 602 in order of their queue size from smallest to largest. This enables the controller to maximize the chance that the last bank being able to server four read requests. (It should be noted that if there are more than four data banks 604, then the last bank queue 602 may have more than four read requests served—the number of read requests served could be equal to the number of data banks 604).

The disclosed scheme for optimizing the accesses per cycle may come with a cost. It may increase the chances of having out-of-order execution of memory access requests. This does not pose a problem in the case where the memory requests are executed out of order for different cores. However, logic, in for example, the memory controller 214 shown in FIG. 2, should be implemented to ensure in-order execution of all requests from each core.

Figure 7A:
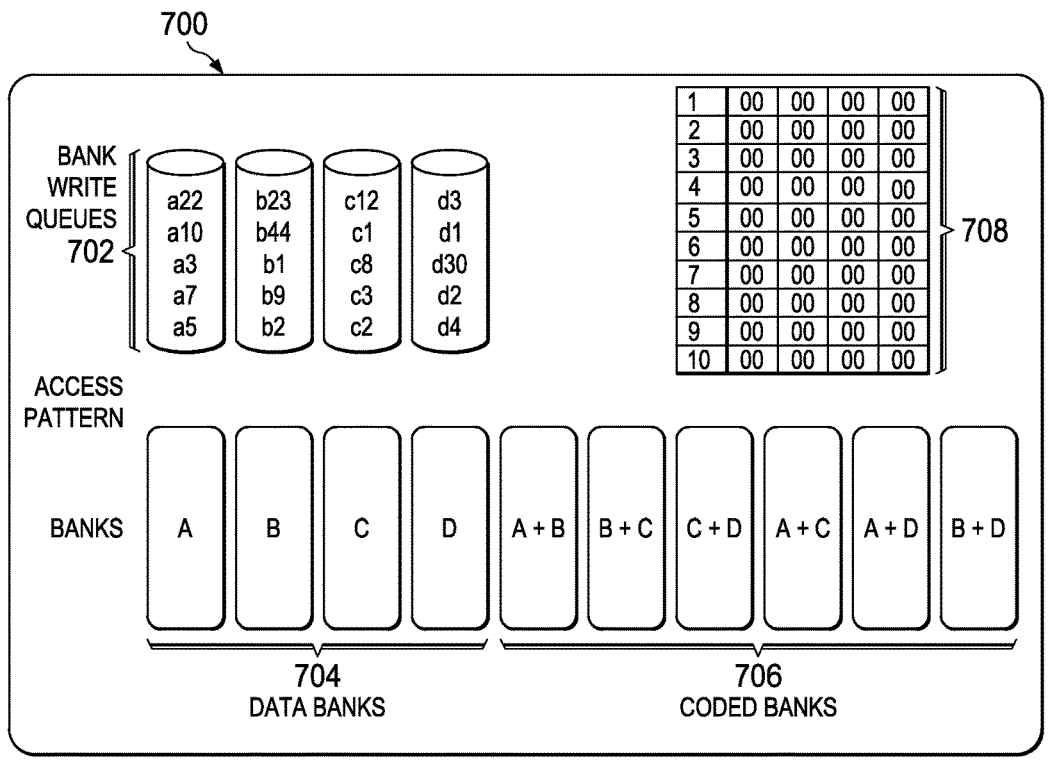
FIGS. 7A and 7B illustrate an embodiment system for writing data to the memory banks.
Figure 7B:
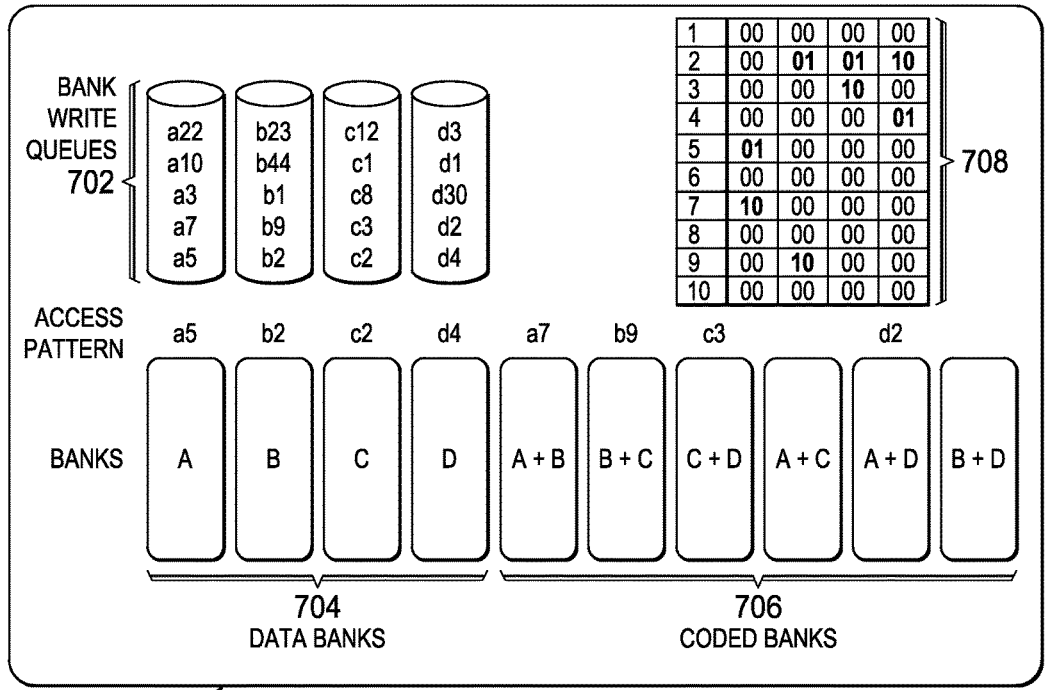

FIGS. 7A and 7B illustrate an embodiment system 700 for writing data to the memory banks. System 700 includes a plurality of bank write queues 702, a plurality of data banks 704, a plurality of coding banks 706, and a status table 708. The status table 708 may be implemented as code status memory 300. The write requests from the cores are first filled in the bank write queues for each bank write queue 702. Each bank write queue 702 holds the requests until the bank write queue 702 is full. The scheduler writes to the memory only when a bank write queue 702 is full and then, only for the bank write queue 702 or bank write queues 702 that are full. This ensures that reads receive priority over writes, thereby substantially minimizing the latency in the system 700.

In an embodiment, the coded system 700 performs two writes per bank 704 per cycle. This is achieved by using the coding banks 706 in the coded memory system 700. When a write is scheduled for a particular bank 704, the scheduler picks up two requests from the head of the corresponding bank write queue 702. The scheduler writes the first request to the corresponding data bank 702. The second write is committed to the coding bank 706 of the respective row.

FIG. 7B shows the access pattern and the updated status table 708 after the write has been executed. In FIG. 7A, the entries for each cell in the status table 708 are "00" indicating that all of the codes in the coded banks 706 are up to date. After execution of the write, the entries for row 2-column 2, row 2-column 3, row 4-column 4, are row 5-column 1 are changed to "01" to indicate that the codes are outdated and that the fresh data is found in the data bank 704. After execution of the write, the entries for row 2-column 4, row 3-column 3, row 7-column1, and row 9-column 2 are changed to "10" to indicate that the codes are outdated and that the fresh data is found in the coding bank 706. The remaining cells in the status table 708 remain as "00" since no write processes were executed to the corresponding data banks 704 and coded banks 706.

In an embodiment, the coded banks 706 for memory locations corresponding to the cell entries that are marked "01" in the status table 708 are updated so that the data in both the data banks 704 and the coded banks 706 are fresh and the status table 708 for the corresponding cells is changed back to "00" to indicate that the codes are up to date for these memory locations. Similarly, in an embodiment, the data banks 704 for memory locations corresponding the cell entries that are marked "10" in the status table 708 are updated so that the data in both the data banks 704 and the coded banks 706 are fresh and the status table 708 for the corresponding cells is changed back to "00" to indicate that the codes are up to date for these memory locations. The updates can be performed, for example, during periods of lower memory access requests, thereby allowing memory accesses to occur more rapidly and not be slowed by the data write processes.

Figure 8:
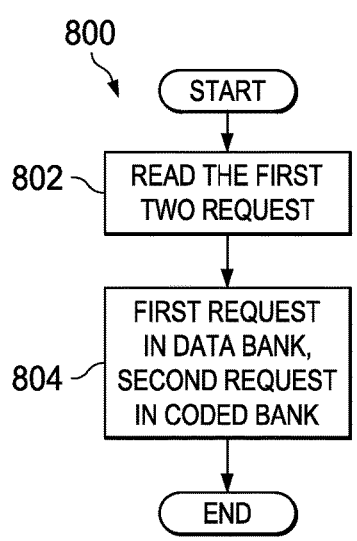
FIG. 8 is a flowchart of an embodiment of a method to write data from memory.

FIG. 8 is a flowchart of an embodiment of a method 800 to write data from memory. The method 800 begins at block 802 where the access scheduler reads the first two requests from the bank queues 702. At block 804, the first request is written to the corresponding data bank 704 and the second request is written to the corresponding the coding bank 706. In an embodiment, these two writes are performed in parallel, thereby increasing the write speed for the system.

In the depicted example in FIGS. 7A and 7B, the bank write queue 702 is full for all four banks 804. The scheduler pics up the two write requests and schedules them to be written to be written to the respective data bank 704 and the coding bank 706. The scheduler also updates the code status table map 708 with the appropriate status. The scheduler updates the writes committed to the data bank 704 with "01" and writes committed to coding bank 706 with "10".

A note for the above example about all banks being full at the same time. This is not a general case. The write or read operation is selected for each bank 704. The controller is designed to schedule read and write for each bank 704 depending on the queue size and the availability of coding banks 706. In an embodiment, a write queue threshold is programmed. If the write queue contains more requests than a threshold, the write access to banks are scheduled. This ensures that reads are prioritized over writes. Moreover, the queues serve as a cache for subsequent read/write requests. The controller first checks the write queue before accessing the banks 704.

In an embodiment, another exception to the write logic is that when the accesses are linear in nature for the four banks 704. For example, if the write is to a1, b1, c1, and d1. In such a case, the scheduler updates the coding banks to write the codes a1+b1, b1+c1, c1+d1, d1+a1, d1+b1, and a1+c1. This ensures that the coding banks remain updated and the memory controller no longer needs to update the coding bank. This is the best case scenario where the scheduler always tries to meet.

Figure 9A:
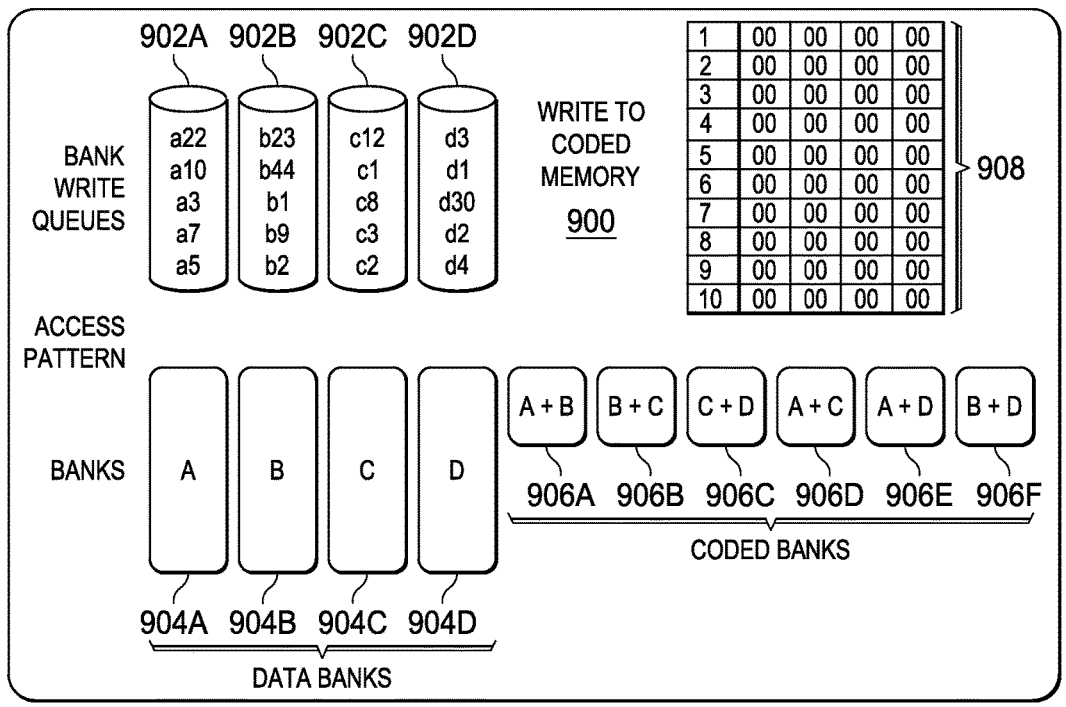
FIGS. 9A-9Y are block diagrams of an embodiment of a system illustrating a write method.
Figure 9B:
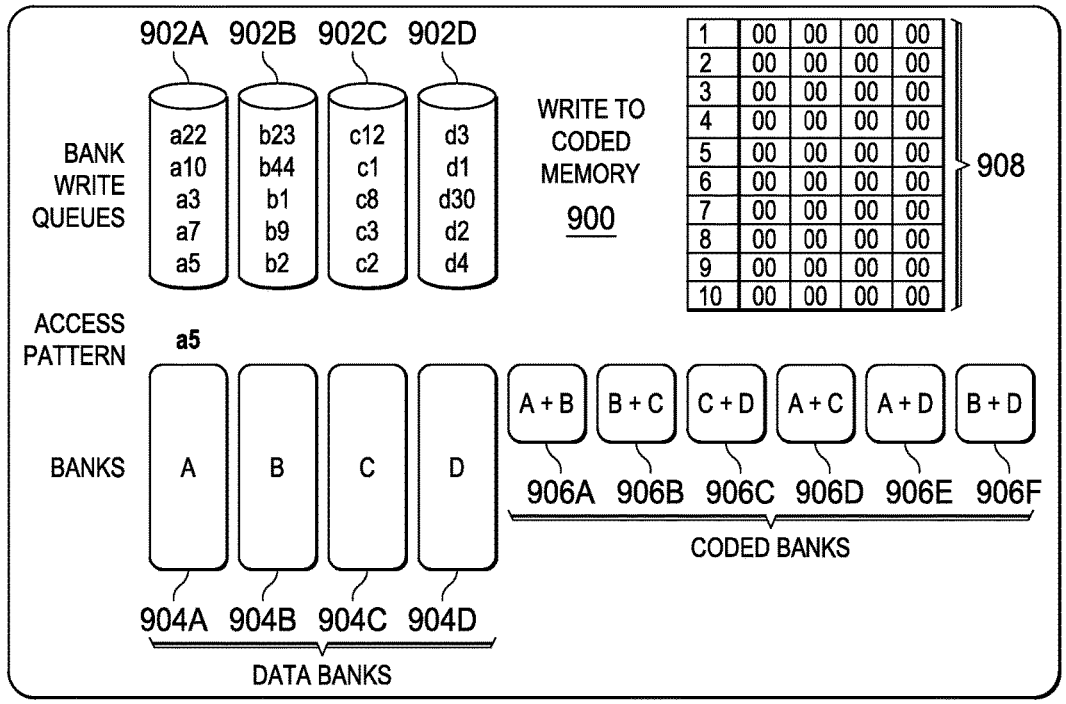
Figure 9C:
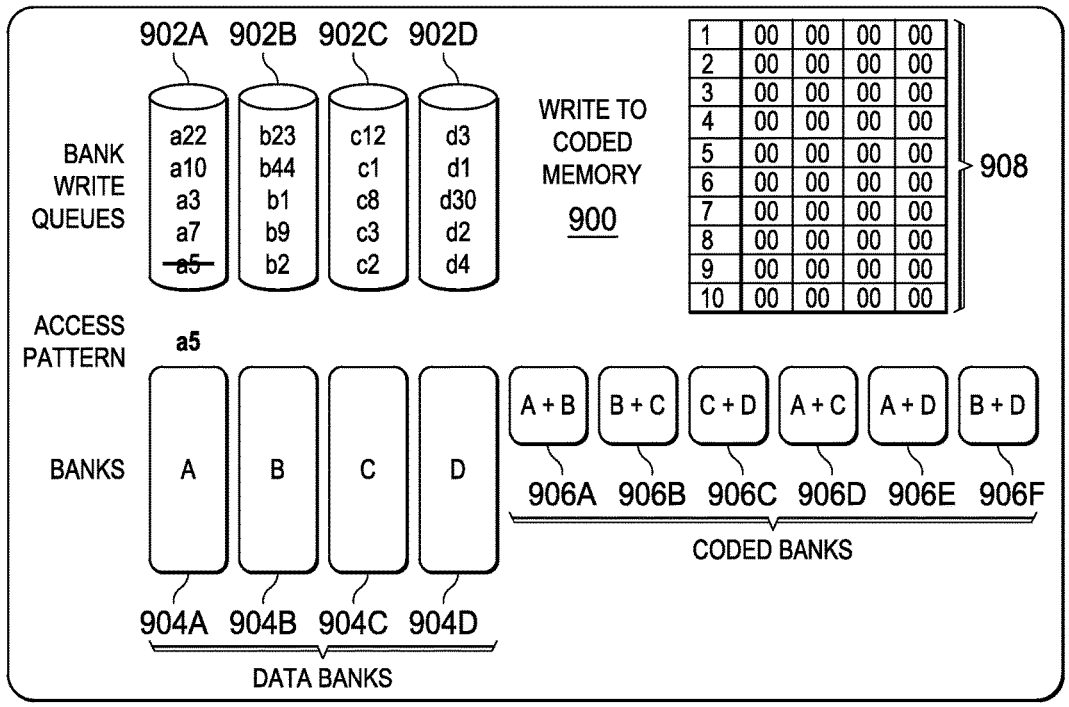
Figure 9D:
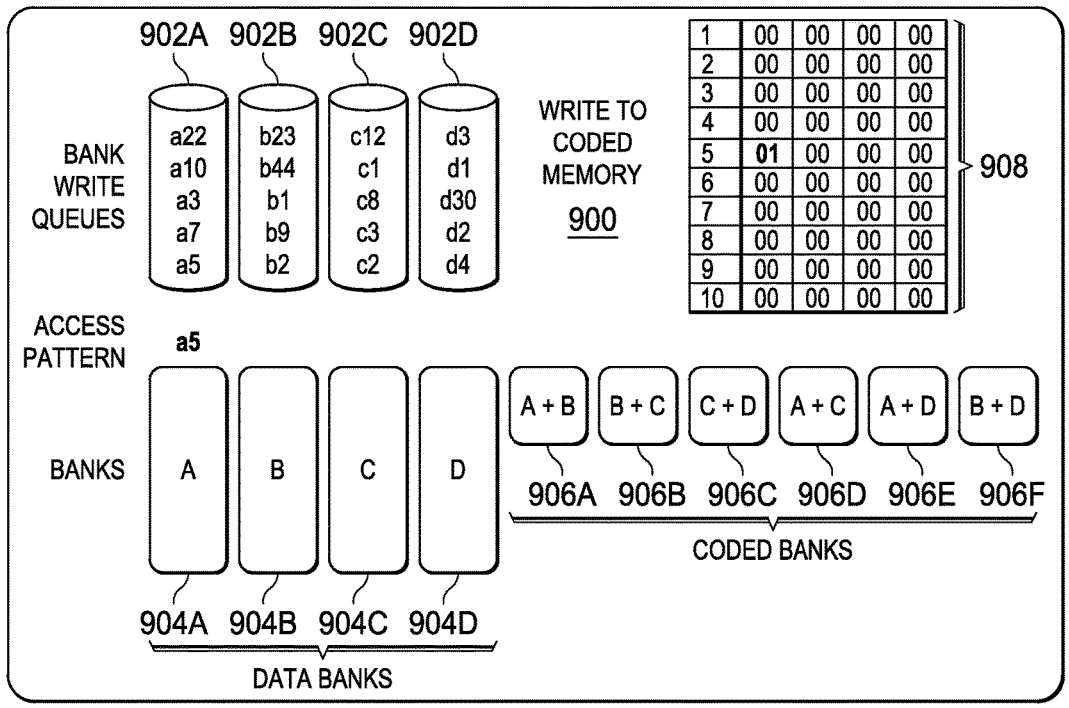
Figure 9E:
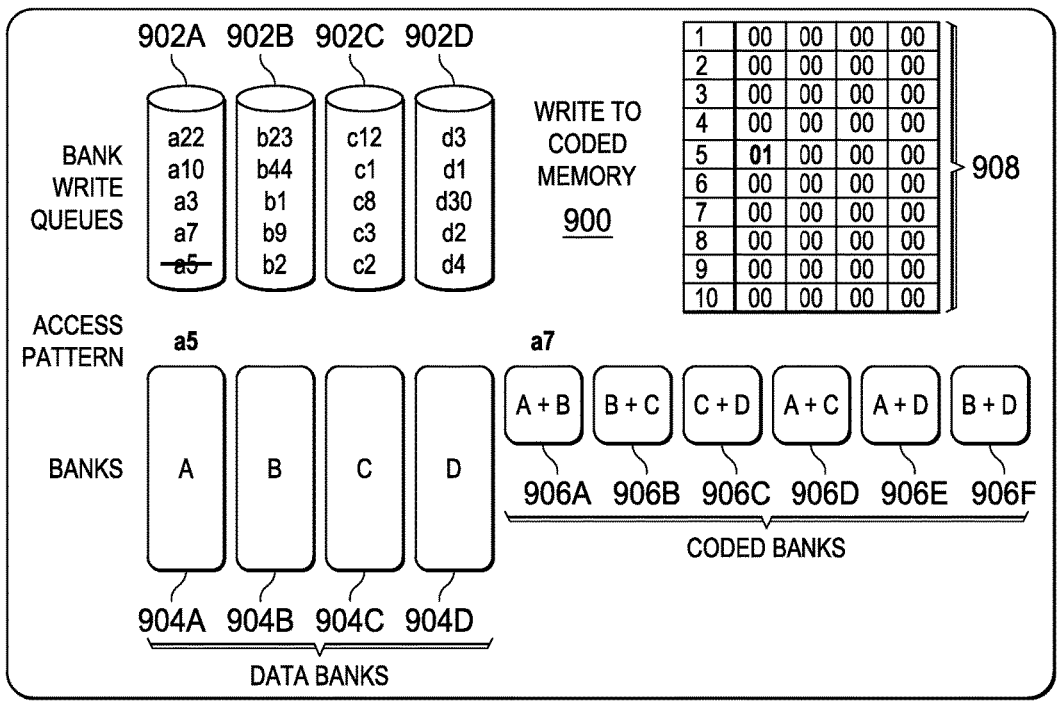
Figure 9F:
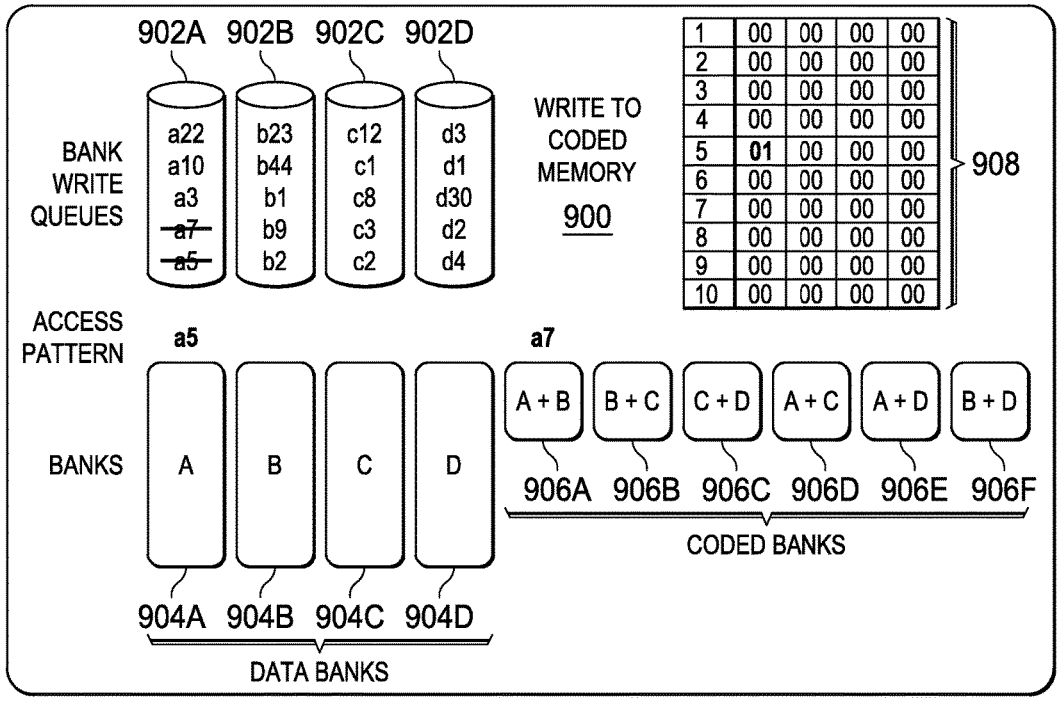
Figure 9G:
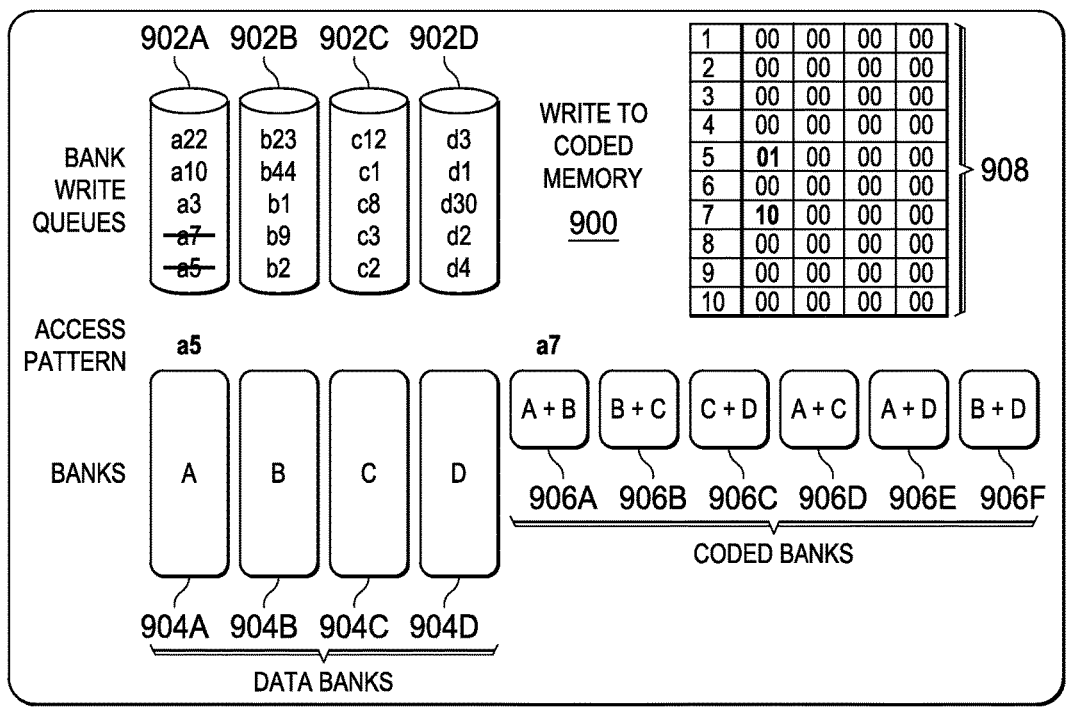
Figure 9H:
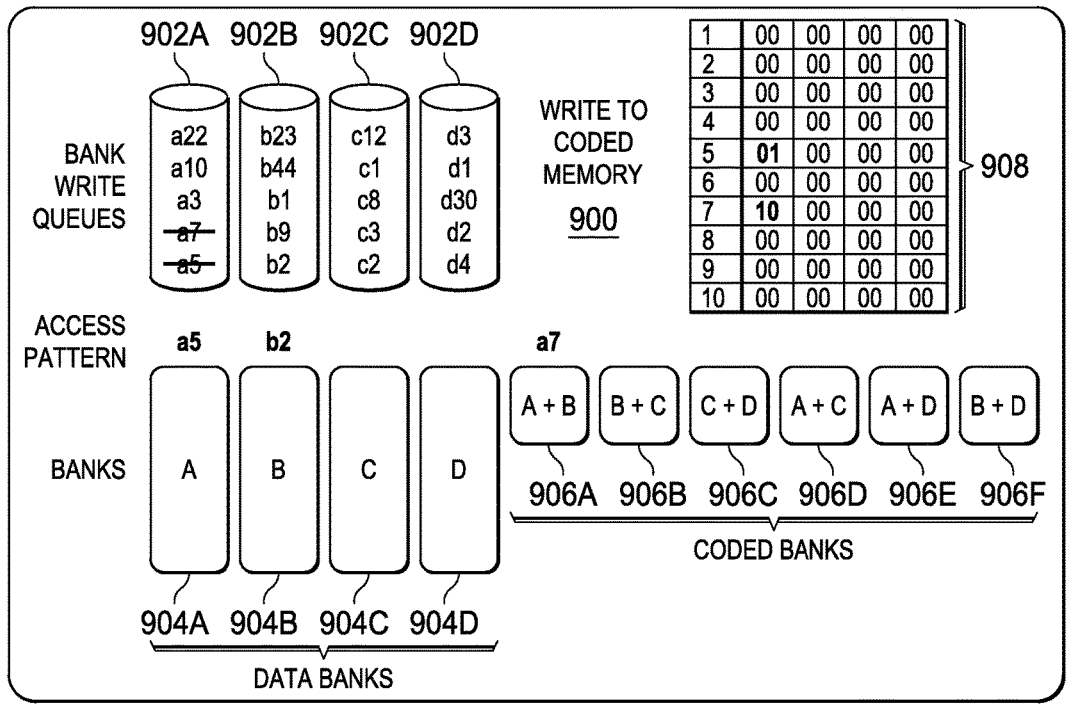
Figure 9I:
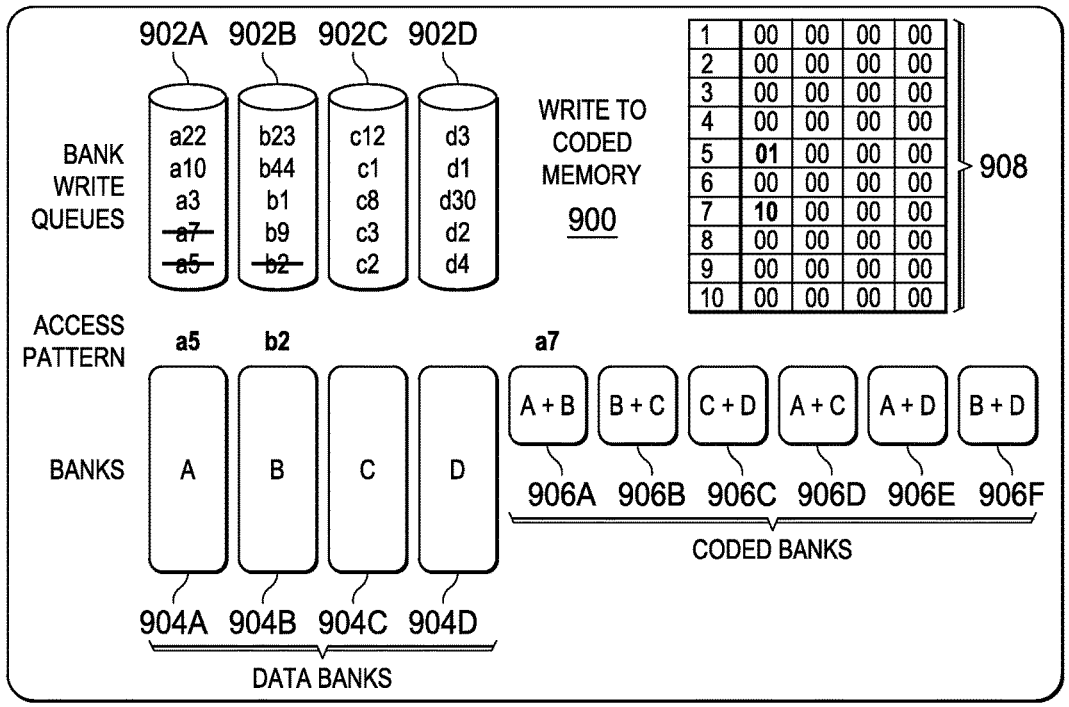
Figure 9J:
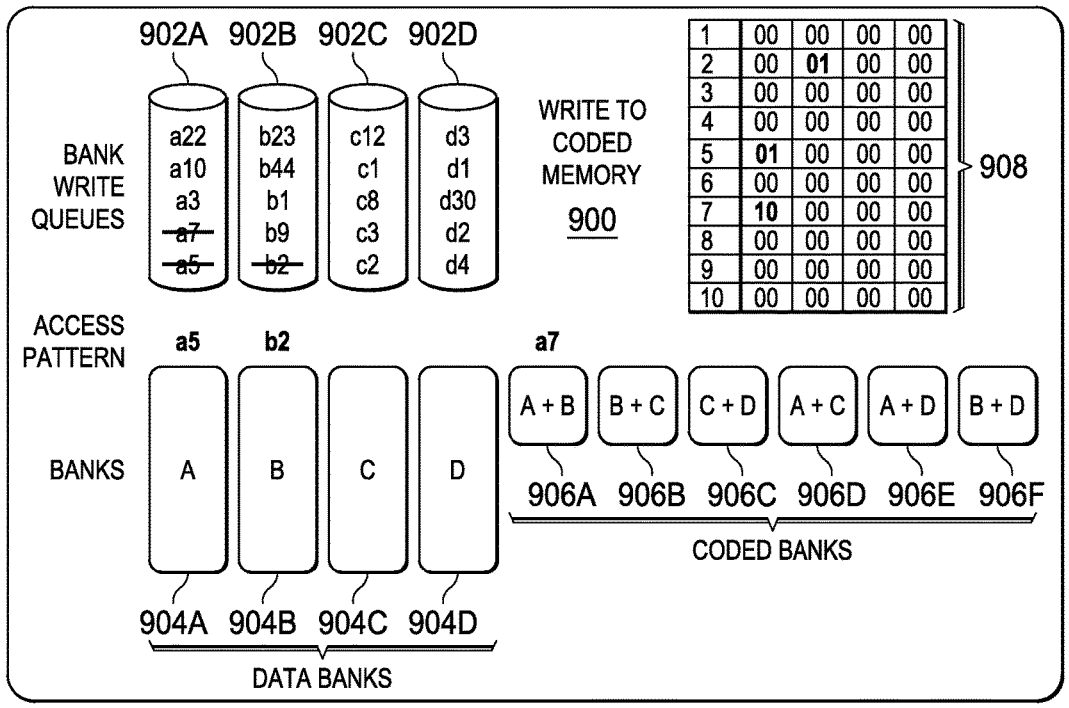
Figure 9K:
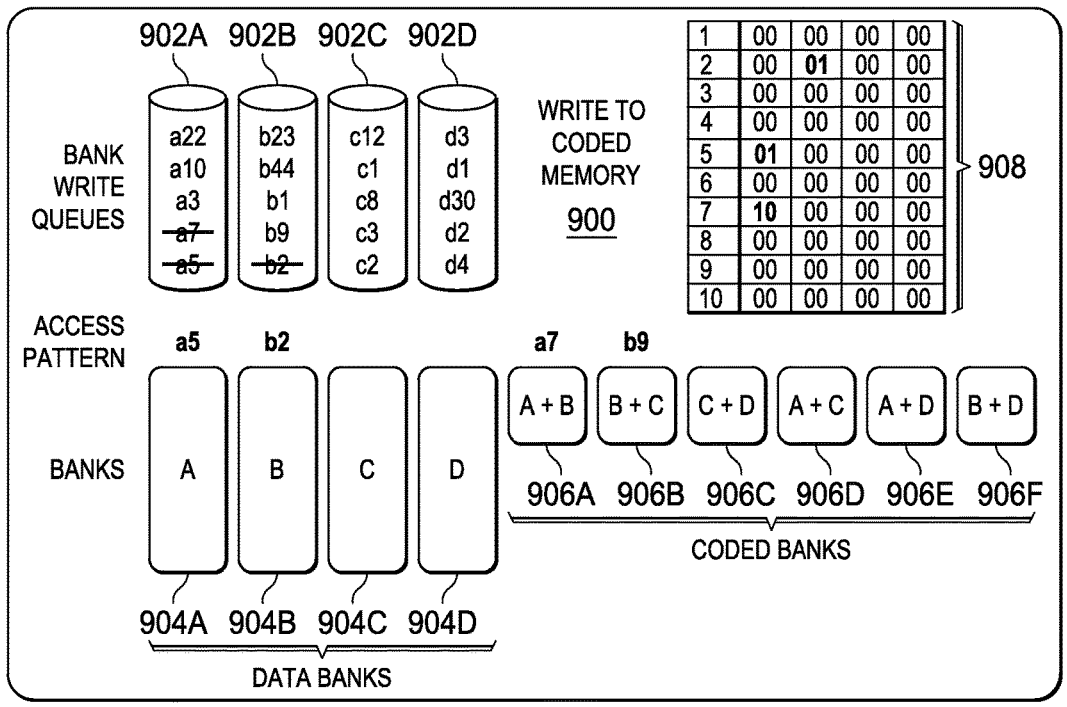
Figure 9L:
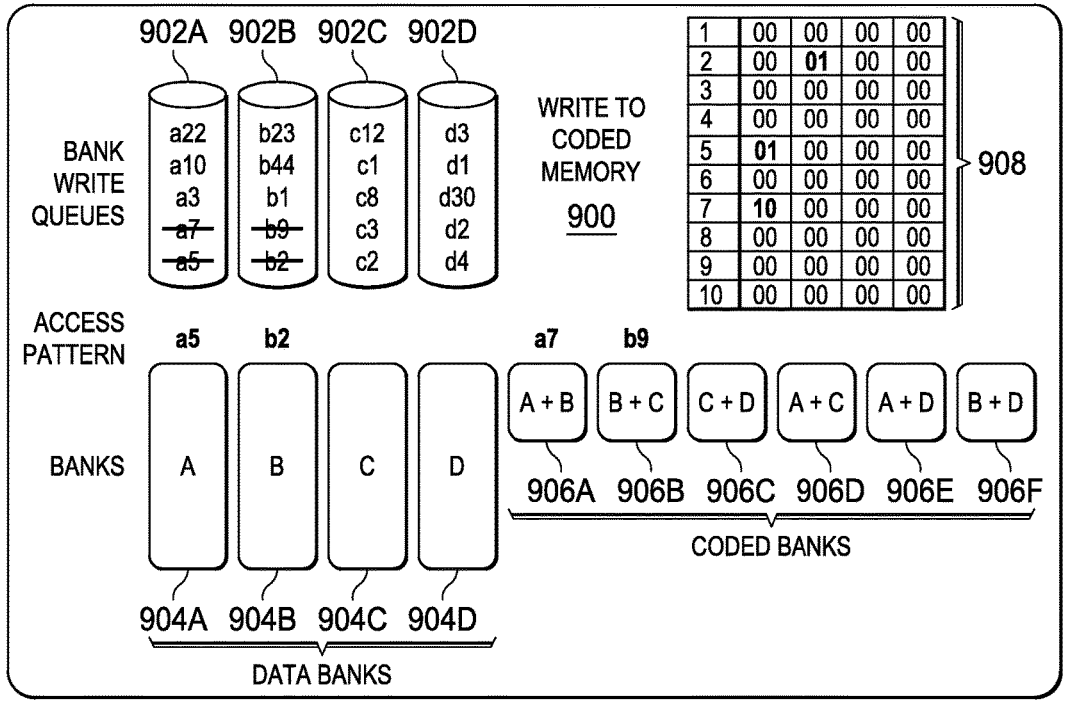
Figure 9M:
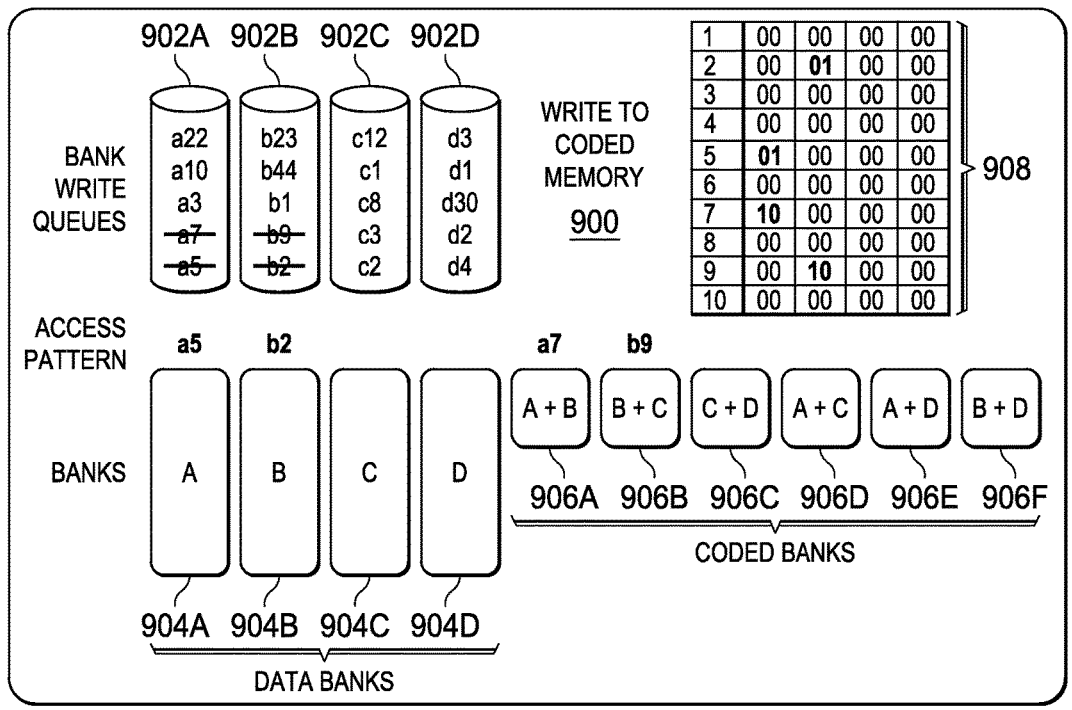
Figure 9N:
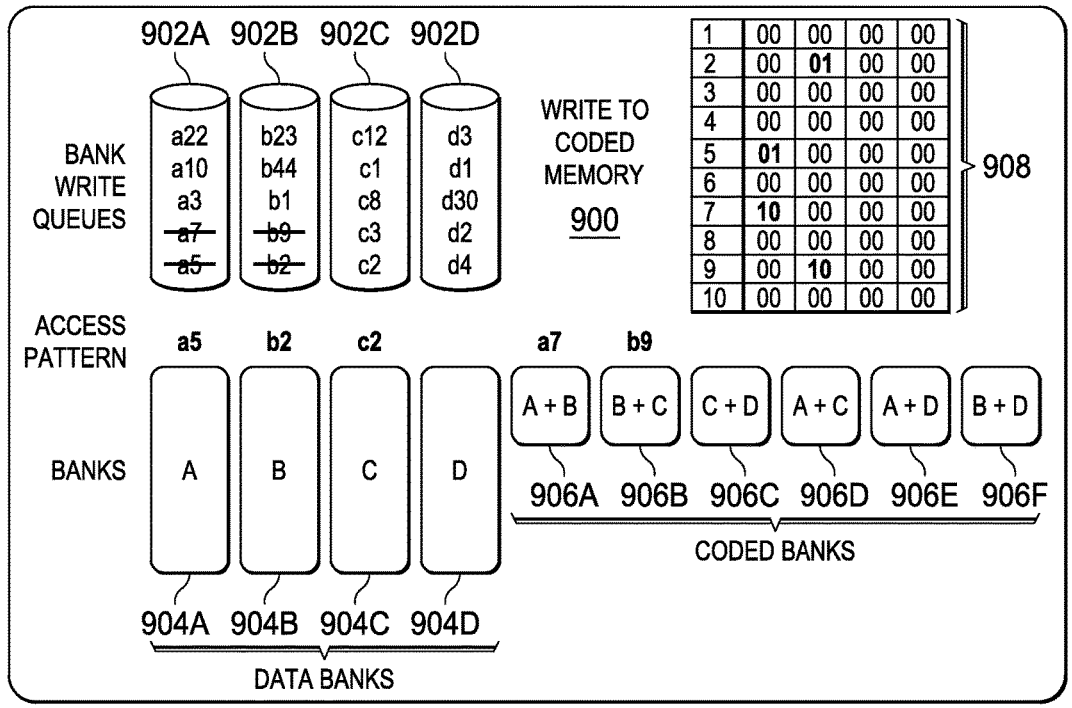
Figure 9O:
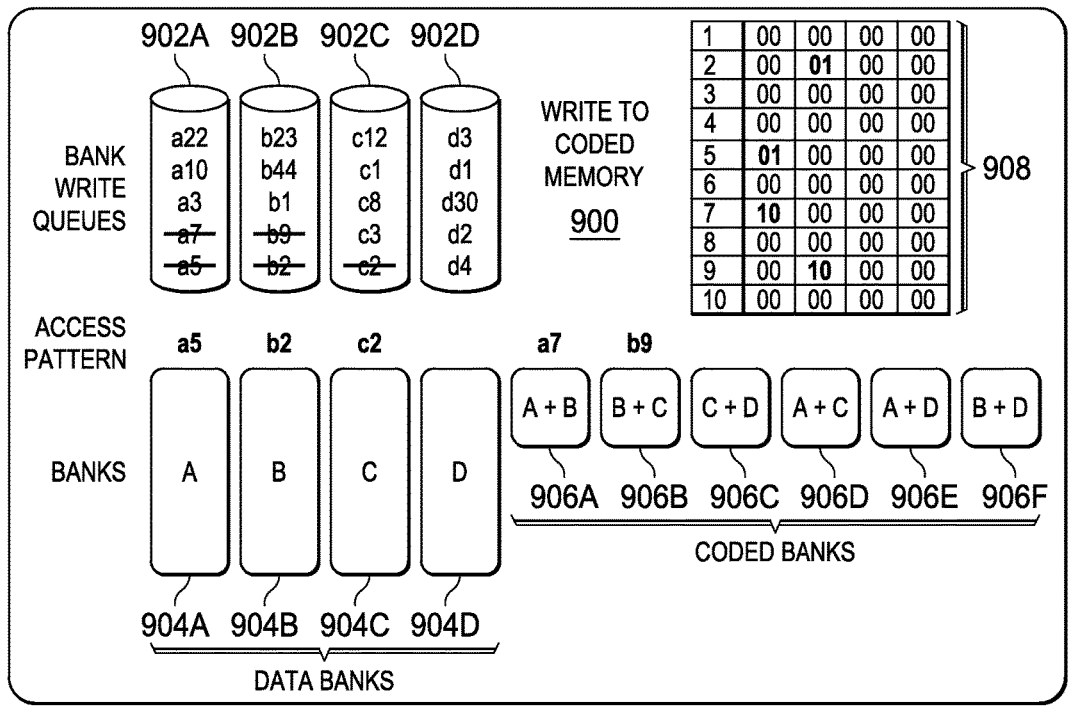
Figure 9P:
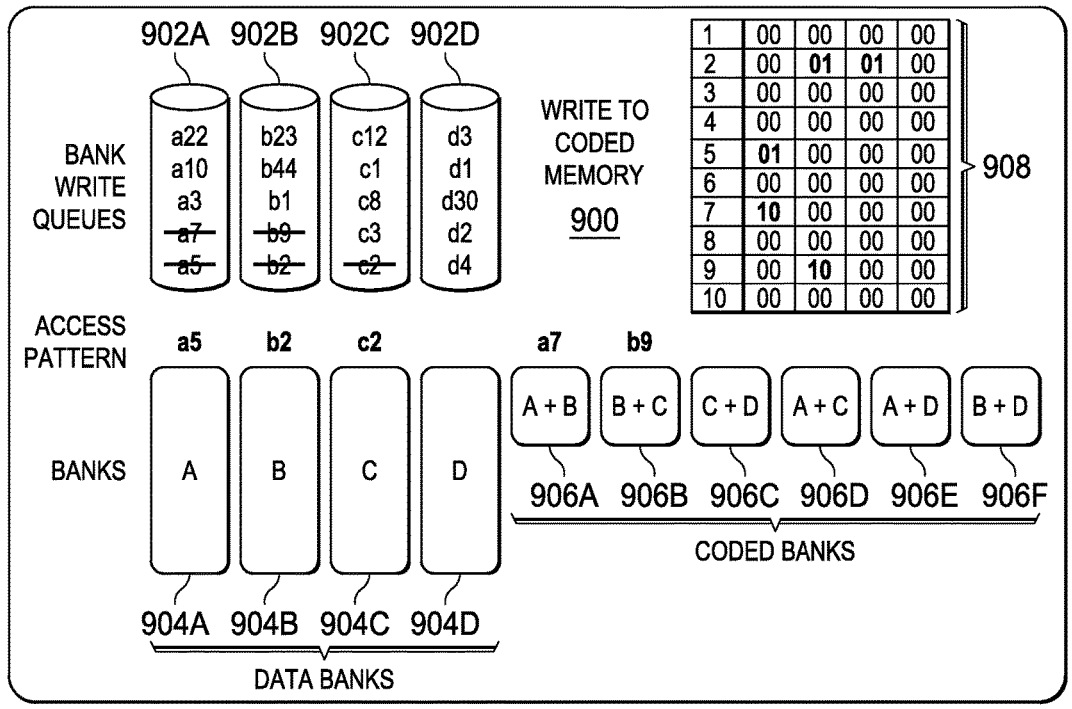
Figure 9Q:
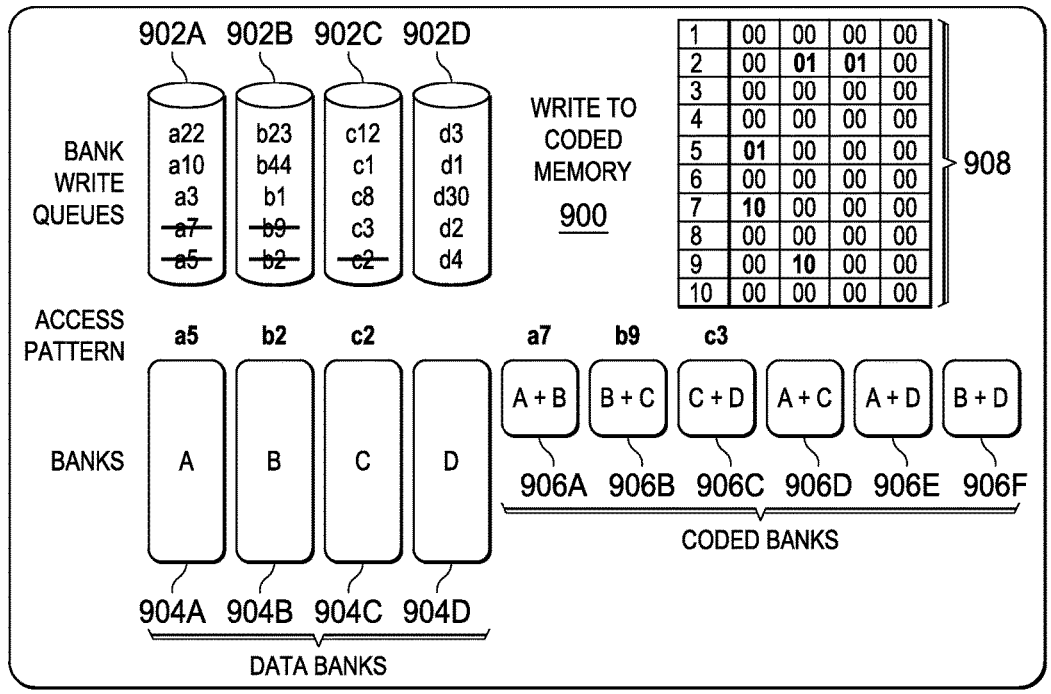
Figure 9R:
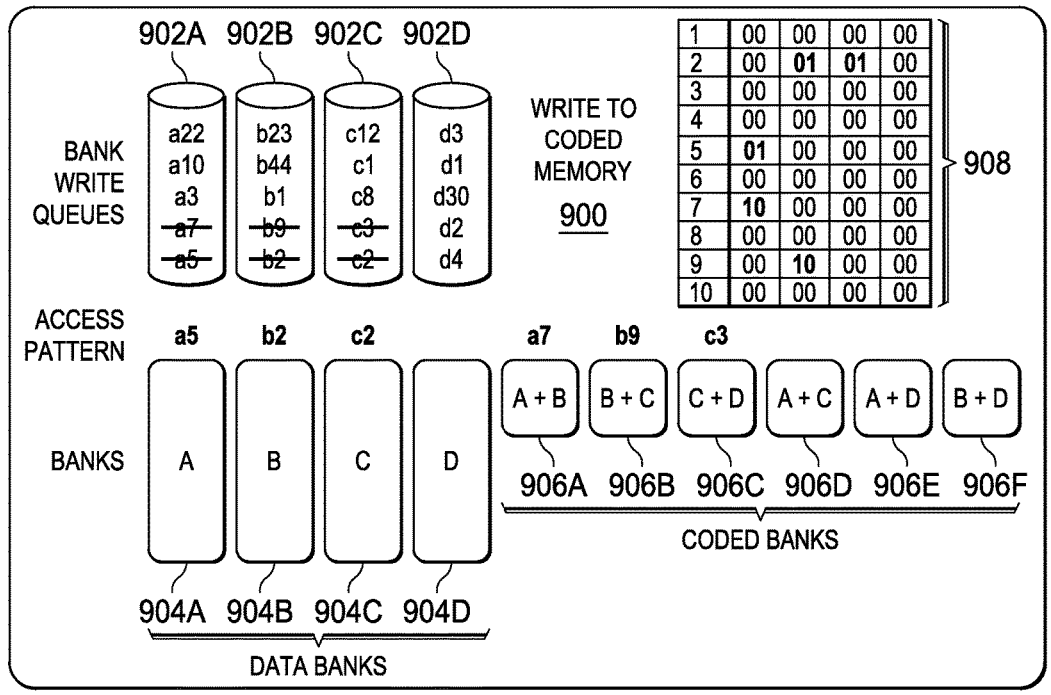
Figure 9S:
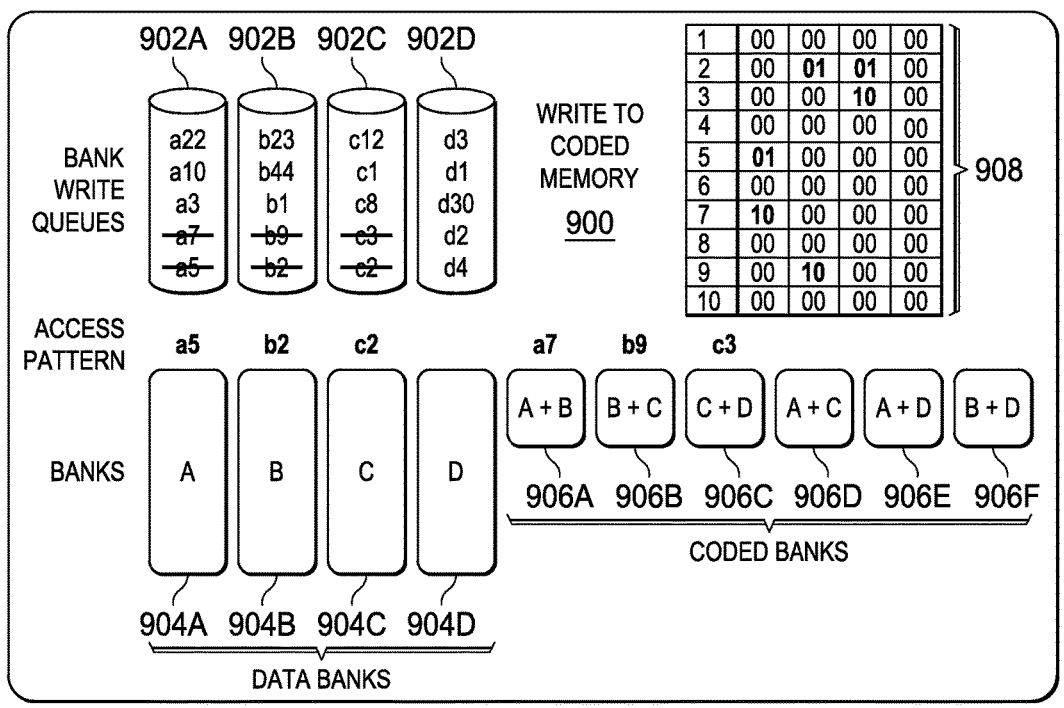
Figure 9T:
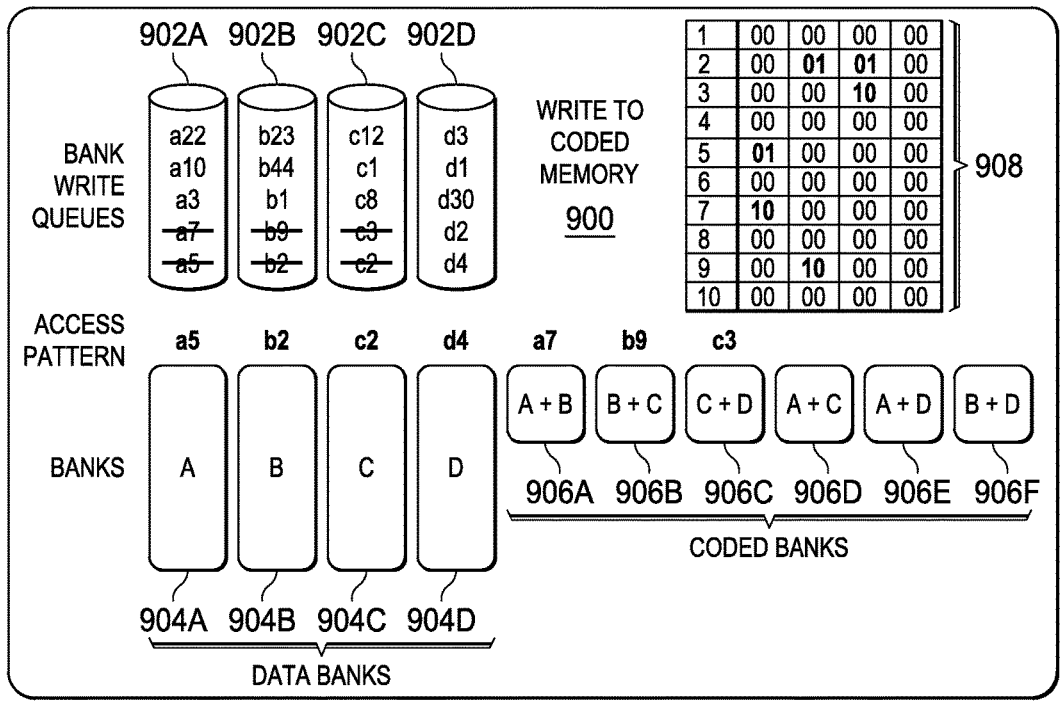
Figure 9U:
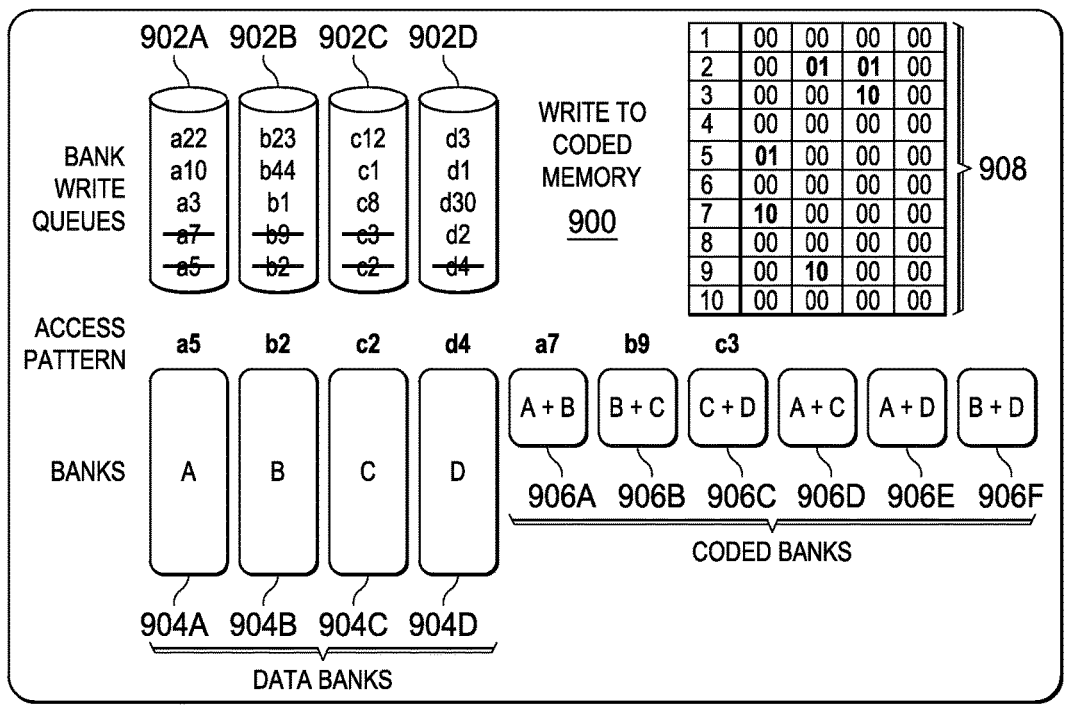
Figure 9V:
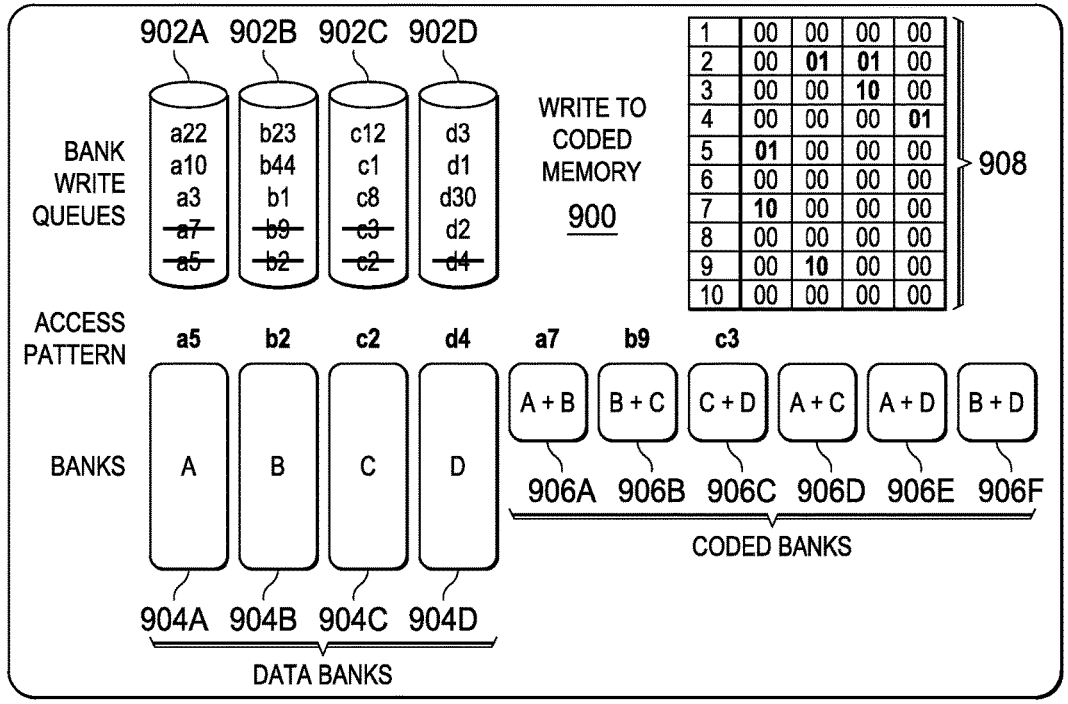
Figure 9W:
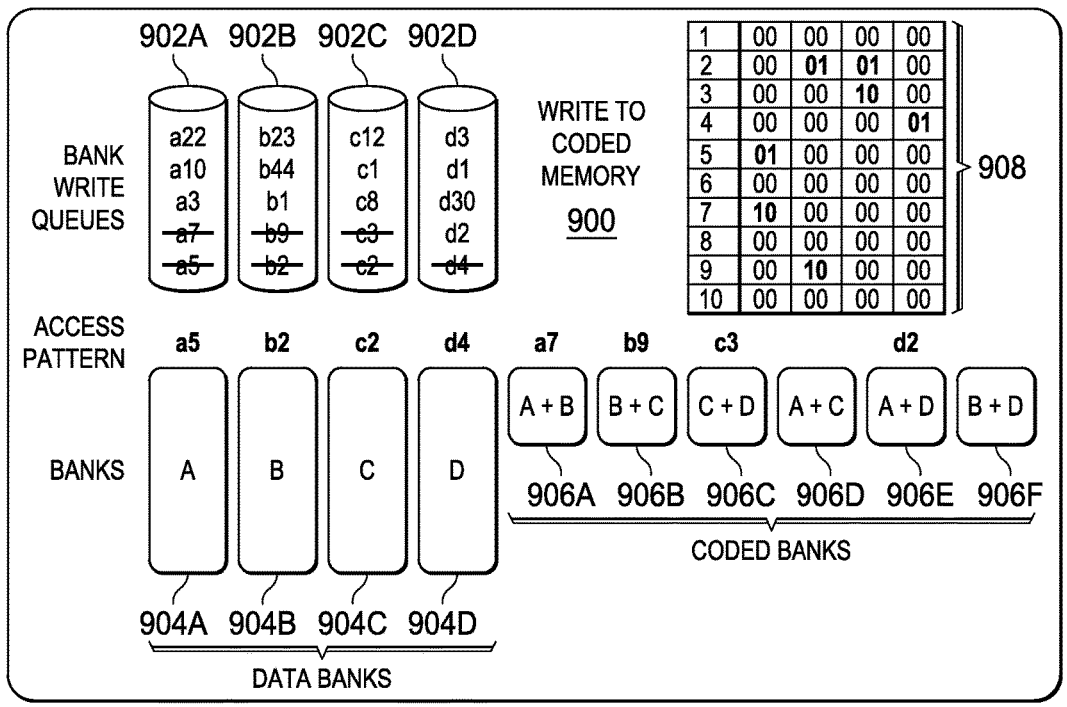
Figure 9X:
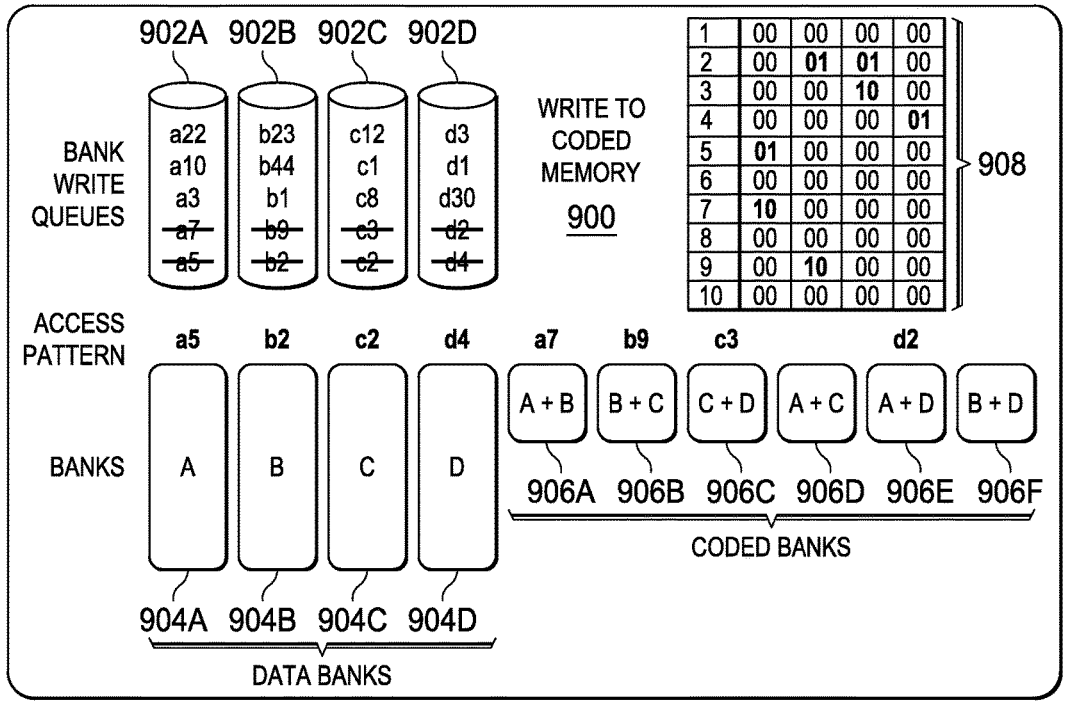
Figure 9Y:
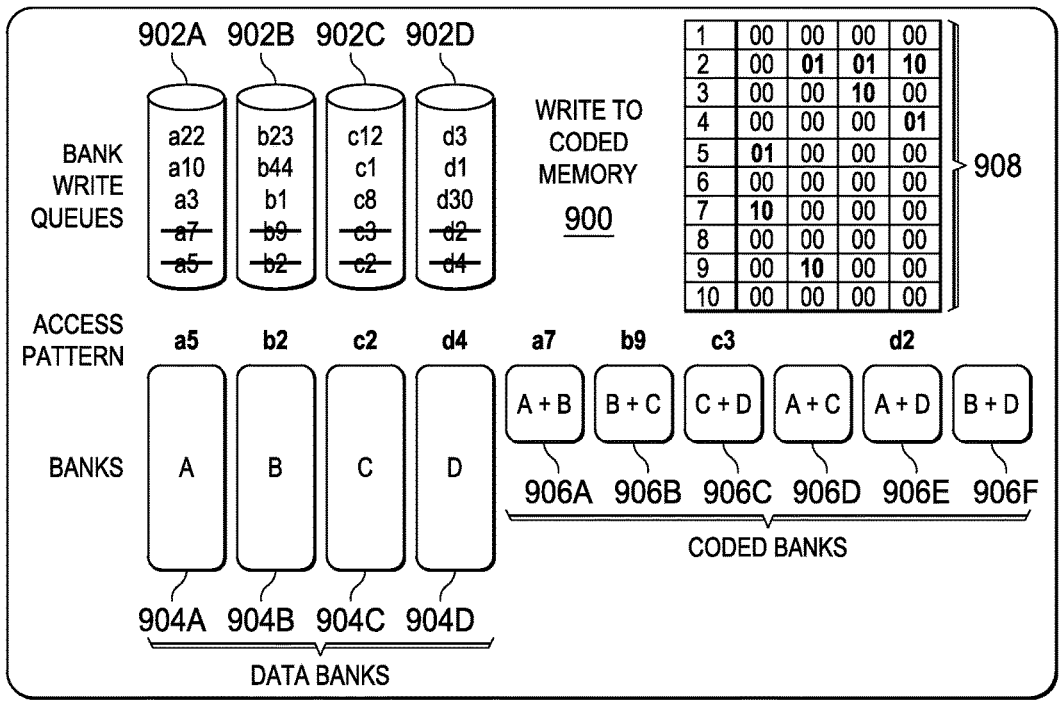

FIGS. 9A-9Y are block diagrams of an embodiment of a system 900 illustrating a write method. System 900 includes a plurality of bank write queues 902A, 902B, 902C, 902D, a plurality of data banks 904A, 904B, 904C, 904D, a plurality of coding banks 906A, 906B, 906C, 906D, 906E, 906F, and a code status table 908. Although depicted as four data banks 904, those of ordinary skill in the art will recognize that the disclosed systems and methods apply to a memory that includes any number of data banks. In an embodiment, the bank write queues 902A, 902B, 902C, 902D may be implemented as bank queues 208 in FIG. 2. In an embodiment, the data banks 904A, 904B, 904C, 904D may be implemented as the memory banks 210 in FIG. 2. In an embodiment, the coding banks 906A, 906B, 906C, 906D, 906E, 906F may be implemented as the coding banks 212 in FIG. 2. The writes are maximized by using the coding banks 606A, 606B, 606C, 606D, 606E, 606F. Bank write queue 902A includes write requests to write data to data bank 904A; bank write queue 902B includes write requests to write data to data bank 904B; bank write queue 902C includes write requests to write data to data bank 904C; and bank write queue 902D includes write requests to write data to data bank 904D. In the depicted example, as shown in FIG. 9A, the bank write queue 902A includes a request to write to a5 (i.e., a write to the fifth row of memory bank A 904A), a request to write to a7, a request to write to a3, a request to write to a10, and a request to write to a22. The bank write queue 902B includes requests to write to b2, b9, b1, b44, and b23. The bank write queue 902C includes requests to write to c2, c3, c8, c1, and c12. The bank write queue 902D includes requests to write to d4, d2, d30, d1, and d3. All of the entries in the code status table 908 for each row for each data bank (represented by columns, where the first column corresponds to data bank 904A, the second column corresponds to data bank 904B, etc.) are "00" indicated that the codes are up to date, i.e., the coding banks 906 and the data banks are up to date.

The write is selected for a bank when the bank write queue 902 for the corresponding bank is full. The scheduler picks up two elements from each bank for writes. The scheduler schedules the first element to be written to the data bank 904 and the second one to be written to the coding bank 906. The memory controller updates the code status table map 908 according to Table 1. For elements stored to the data bank 904, i.e., the first element, the memory controller updates the corresponding entry in the code status table map 908 to "01" and for elements stored in the coding bank, i.e., the second element selected from the bank write queue 902, the memory controller updates the corresponding entry in the code status table 908 to "10".

Thus, in the example depicted in FIGS. 9A-9Y, the scheduler selects a5 and a7 from bank write queue 902A. The scheduler writes a5 to data bank 904A as indicated in FIG. 9B, eliminates a5 from the bank write queue (illustrated by a line crossed through a5) as indicated in FIG. 9C, and updates the entry for row 5, column 1 (corresponding to fifth row for data bank 904) in the code status table map 908 to be "01" as shown in FIG. 9D. The scheduler also writes a7 to coding bank 906A as indicated in FIG. 9E, eliminates a7 from the bank write queue 902A as shown in FIG. 9F, and updates that entry for row 7, column 1 in the code status table map 908 to be "10".

Since bank write queue 902B is also full, the scheduler picks the first two elements in the queue (i.e. b2 and b9) and writes b2 to data bank 904B as shown in FIG. 9H, eliminates b2 from the bank write queue 902B as shown in FIG. 9I, and updates the entry for row 1, column 2 in the code status table map 908 to be "01" as shown in FIG. 9J. The scheduler also writes b9 to the coding bank 906B as shown in FIG. 9K, eliminates b9 from the bank write queue 902B as shown in FIG. 9L, and updates the entry for row 9, column 2 in the code status table map 908 to be "10" as shown in FIG. 9M.

Since bank write queue 902C is also full, the scheduler picks the first two elements in the queue (i.e. c2 and c3) and writes c2 to data bank 904C as shown in FIG. 9N, eliminates c2 from the bank write queue 902C as shown in FIG. 9O, and updates the entry for row 2, column 3 in the code status table map 908 to be "01" as shown in FIG. 9P. The scheduler also writes c3 to the coding bank 906C as shown in FIG. 9Q, eliminates c3 from the bank write queue 902C as shown in FIG. 9R, and updates the entry for row 3, column 3 in the code status table map 908 to be "10" as shown in FIG. 9S.

Since bank write queue 902D is also full, the scheduler picks the first two elements in the queue (i.e. d4 and d2) and writes d4 to data bank 904D as shown in FIG. 9T, eliminates d4 from the bank write queue 902D as shown in FIG. 9U, and updates the entry for row 4, column 4 in the code status table map 908 to be "01" as shown in FIG. 9V. The scheduler also writes d2 to the coding bank 906D as shown in FIG. 9W, eliminates d2 from the bank write queue 902D as shown in FIG. 9X, and updates the entry for row 2, column 4 in the code status table map 908 to be "10" as shown in FIG. 9Y.

Figure 10:
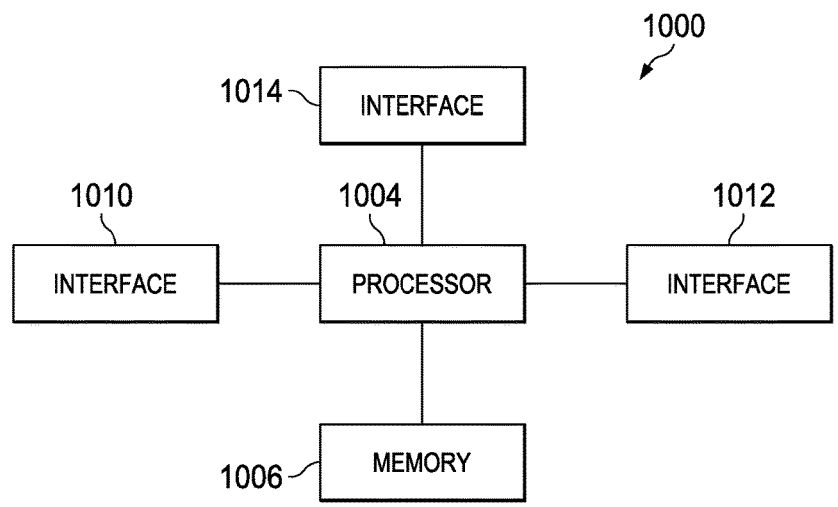
FIG. 10 illustrates a block diagram of an embodiment processing system for implementing the multi-core processor and for performing methods described herein.

FIG. 10 illustrates a block diagram of an embodiment processing system 1000 for performing methods described herein, which may be installed in a host device. As shown, the processing system 1000 includes a master 1004, a memory 1006, and interfaces 1010-1014, which may (or may not) be arranged as shown in FIG. 10. A master represents any module that can initiate read and write access to the memory and, in various embodiments, may include CPU/DSP cores, a DMA, and a HAC hardware accelerator. The master 1004 may be any component or collection of components adapted to perform computations and/or other processing related tasks, and the memory 1006 may be any component or collection of components adapted to store programming and/or instructions for execution by the master 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the master 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In an embodiment, a method for accessing data in a memory includes forming, by a scheduler, a read pattern for reading data from memory to serve requests in a plurality of read bank queues, the memory comprising a plurality of memory banks and a plurality of coding banks, the coding banks storing a coded version of at least some of the data stored in the plurality of memory banks; reading, by the scheduler a first data from a first memory bank; reading, by the scheduler, coded data from one of the coding banks, the coded data comprising coded first and second data; and determining, by the scheduler, the second data according to the coded data and the first data. Reading the first data from the first memory bank and reading the coded data from one of the coding banks are performed in parallel. In an embodiment, the requests in the plurality of read bank queues are read in a different order from an order of the requests in the plurality of read bank queues. In an embodiment, the method also includes selecting a first element and a second element from a write bank queue; writing the first element to a memory bank; and writing the second element to a coding bank as a coded memory element. The method may also include updating a status memory according to the writing the first element and the writing the second element, the status memory denoting a status of a code for a section of the memory bank, the status indicating whether the codes in the coding bank are up to date with the data in the memory bank, whether the codes are outdated and the data in the memory bank is current, or whether the codes are outdated and data in the coding bank is current. In an embodiment, the method includes scheduling more reads per cycle than writes per cycle. In an embodiment, the method includes scheduling a write to memory only when the write bank queue is full or when a threshold is satisfied. In an embodiment, the threshold is different for different banks. In an embodiment, forming the read pattern includes determining a first read request from a first bank queue; scheduling the first read request to be read from one of the memory banks; and searching a second bank queue to determine whether any read requests from the second bank queue can be served from one of the coding banks using a read for the first read request. In an embodiment, the first read request is determined according to the size of the bank queues.

In an embodiment, a method in one or more master processors for accessing data in a memory includes selecting a first element and a second element from a write bank queue; writing the first element to a memory bank; and writing the second element to a coding bank as a coded memory element, the writing the first element to the memory bank performed in parallel with the writing the second element to the coding bank.

In an embodiment, a data processing system includes a one or more master processors and a non-transitory computer readable storage medium storing programming for execution by the processor, the programming including instructions to: form a read pattern for reading data from memory to serve requests in a plurality of read bank queues, the memory comprising a plurality of memory banks and a plurality of coding banks, the coding banks storing a coded or coded version of at least some of the data stored in the plurality of memory banks; read a first data from a first memory bank; read coded data from one of the coding banks, the coded data comprising coded first and second data; and determine the second data according to the entry and the first data. The instructions to read the first data from the first memory bank and the instructions to read the coded data from one of the coding banks are performed in parallel. In an embodiment, the requests in the plurality of read bank queues are read in a different order from an order of the requests in the plurality of read bank queues. In an embodiment, the programing also includes instructions to: select a first element and a second element from a write bank queue; write the first element to a memory bank; and write the second element to a coding bank as a coded memory element. In an embodiment, the programming also includes instructions to update a status memory according to the writing the first element and the writing the second element, the status memory denoting a status of a code for a section of the memory bank, the status indicating whether the codes in the coding bank are up to date with the data in the memory bank, whether the codes are outdated and the data in the memory bank is current, or whether the codes are outdated and data in the coding bank is current. In an embodiment, the programming includes instructions to schedule more reads per cycle than writes per cycle. In an embodiment, the programming includes instructions to schedule a write to memory only when the write bank queue is full. In an embodiment, the instructions to form the read pattern comprises instructions to: determine a first read request from a first bank queue; schedule the first read request to be read from one of the memory banks; and search a second bank queue to determine whether any read requests from the second bank queue can be served from one of the coding banks using a read for the first read request. In an embodiment, the first read request is determined according to the size of the bank queues.

In an embodiment, a processor includes a plurality of master core processors; a coded memory controller; and a memory comprising a plurality of memory banks and a plurality of coding banks, the coding banks comprising coded data of at least a part of the data in the memory banks, wherein the coded memory controller comprises a plurality of bank queues and an access scheduler, wherein the bank queues comprise a list of read requests and write requests; wherein the access scheduler searches the bank queues and schedules read operations from the memory such that a read operation from a memory bank corresponding to a first read request enables obtaining data from one of the coding banks that satisfies a second read request, wherein the access scheduler obtains two entries from a write bank queue and writes a first entry to one of the memory banks and writes a second entry to one of the coding banks as a coded data entry, and wherein the access scheduler schedules more reads per cycle than writes per cycle. In an embodiment, the processor also includes a status memory maintained by the access scheduler, wherein the status memory indicates whether data in a memory bank and a coding bank are up to date. The status of a memory location stored in the status memory indicates one of three statuses, wherein the three statuses include (1) the data in the memory bank and the data in the coding bank for a corresponding memory location are both up to date, (2) only the data in the memory bank for the corresponding memory location is up to date, and (3) only the data in the coding bank for the corresponding memory location is up to date. In an embodiment, the access scheduler determines a first read request to serve according to the size of the bank queues. In an embodiment, the access scheduler schedules some write requests out of order.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for accessing data in a memory, comprising:
determining, by a scheduler, a read pattern for reading data from memory to serve requests in a plurality of read bank queues, the memory comprising a plurality of memory banks and a plurality of coding banks, the coding banks storing a coded version of at least a portion of the data stored in the plurality of memory banks;
reading, by the scheduler, first data from a first memory bank of the memory banks;
reading, by the scheduler, coded data from a first coding bank of the coding banks;
accessing, by the scheduler, a status memory according to the reading the first data and the reading the coded data, the status memory denoting a status of a code for a section of the first memory bank, the status indicating whether the codes in the first coding bank are up to date with the data in the first memory bank, whether the codes are outdated and the data in the first memory bank is current, or whether the codes are outdated and data in the first coding bank is current; and
serving, by the scheduler, the first data or the coded data according to the status of the code denoted by the status memory.

2. The method of claim 1, wherein reading the first data from the first memory bank and reading the coded data from one of the coding banks are performed in parallel.

3. The method of claim 1, wherein the requests in the plurality of read bank queues are read in a different order from an order of the requests in the plurality of read bank queues.

4. The method of claim 1, further comprising:
selecting a first element and a second element from a write bank queue;
writing the first element to a second memory bank; and
writing the second element to a coding bank as a coded memory element.

5. The method of claim 4, wherein updating the status memory comprises further comprising:
updating the status memory according to the writing the first element and the writing the second element, the status memory denoting a status of a code for a section of the second memory bank, the status indicating whether the codes in the coding bank are up to date with the data in the second memory bank, whether the codes are outdated and the data in the second memory bank is current, or whether the codes are outdated and data in the coding bank is current.

6. The method of claim 4, further comprising:
scheduling more reads per cycle than writes per cycle.

7. The method of claim 4, further comprising:
scheduling a write to memory only when the write bank queue is full or when a threshold is satisfied.

8. The method of claim 7, wherein the threshold is different for different write bank queues.

9. The method of claim 1, wherein determining the read pattern comprises:
determining a first read request from a first bank queue;
scheduling the first read request to be read from one of the memory banks; and
searching a second bank queue to determine whether any read requests from the second bank queue can be served from one of the coding banks using a read for the first read request.

10. The method of claim 9, wherein the first read request is determined according to the size of the read bank queues.

11. A method in one or more master processors for accessing data in a memory, comprising:
selecting a first element and a second element from a write bank queue;
writing the first element to a memory bank;
writing the second element to a coding bank as a coded memory element, wherein writing the first element to the memory bank performed in parallel with the writing the second element to the coding bank; and
updating a status memory to indicate whether the first element and the second element are outdated,
wherein updating the status memory comprises updating the status memory according to the writing the first element and the writing the second element, the status memory denoting a status of a code for a section of the memory bank, the status indicating whether the codes in the coding bank are up to date with the data in the memory bank, whether the codes are outdated and the data in the memory bank is current, or whether the codes are outdated and data in the coding bank is current.

12. A data processing system, comprising:
one or more master processors; and
a non-transitory computer readable storage medium storing programming for execution by the master processors, the programming including instructions to:
   determine a read pattern for reading data from memory to serve requests in a plurality of read bank queues, the memory comprising a plurality of memory banks and a plurality of coding banks, the coding banks storing a coded version of at least a portion of the data stored in the plurality of memory banks;
   read first data from a first memory bank of the memory banks;
   read coded data from a first coding bank of the coding banks;
   access a status memory according to the reading the first data and the reading the coded data, the status memory denoting a status of a code for a section of the first memory bank, the status indicating whether the codes in the first coding bank are up to date with the data in the first memory bank, whether the codes are outdated and the data in the first memory bank is current, or whether the codes are outdated and data in the first coding bank is current; and
   serve the first data or the coded data according to the status of the code denoted by the status memory.

13. The data processing system of claim 12, wherein the instructions to read the first data from the first memory bank and the instructions to read the coded data from one of the coding banks are performed in parallel.

14. The data processing system of claim 12, wherein the requests in the plurality of read bank queues are read in a different order from an order of the requests in the plurality of read bank queues.

15. The data processing system of claim 12, wherein the programing further comprises instructions to:
   select a first element and a second element from a write bank queue;
   write the first element to a second memory bank; and
   write the second element to a coding bank as a coded memory element.

16. The data processing system of claim 15, wherein the programming further comprises instructions to:
   update the status memory according to the writing the first element and the writing the second element, the status memory denoting a status of a code for a section of the second memory bank, the status indicating whether the codes in the coding bank are up to date with the data in the second memory bank, whether the codes are outdated and the data in the second memory bank is current, or whether the codes are outdated and data in the coding bank is current.

17. The data processing system of claim 15, wherein the programming further comprises instructions to:
   schedule more reads per cycle than writes per cycle.

18. The data processing system of claim 15, wherein the programming further comprises instructions to:
   schedule a write to memory only when the write bank queue is full.

19. The data processing system of claim 12, wherein the instructions to determine the read pattern comprises instructions to:
   determine a first read request from a first bank queue;
   schedule the first read request to be read from one of the memory banks; and
   search a second bank queue to determine whether any read requests from the second bank queue can be served from one of the coding banks using a read for the first read request.

20. The data processing system of claim 19, wherein the first read request is determined according to the size of the read bank queues.

21. A processor, comprising:
   a plurality of master core processors;
   a coded memory controller comprising a plurality of bank queues and an access scheduler;
   a memory comprising a plurality of memory banks and a plurality of coding banks, the coding banks comprising coded data of at least a part of the data in the memory banks; and
   a status memory maintained by the access scheduler, wherein the status memory is configured to indicate whether data in a memory bank and a coding bank are outdated, wherein the status memory further is further configured to indicate whether the data in the memory bank and the coding bank are up to date,
   wherein the bank queues comprise a list of read requests and write requests,
   wherein the access scheduler searches the bank queues and schedules read operations from the memory such that a read operation from a memory bank corresponding to a first read request enables obtaining data from one of the coding banks that satisfies a second read request, and
   wherein the access scheduler obtains two entries from a write bank queue and writes a first entry to one of the memory banks and writes a second entry to one of the coding banks as a coded data entry.

22. The processor of claim 21, wherein a status of a memory location stored in the status memory indicates one of three statuses, wherein the three statuses include (1) the data in the memory bank and the data in the coding bank for a corresponding memory location are both up to date, (2) only the data in the memory bank for the corresponding memory location is up to date, and (3) only the data in the coding bank for the corresponding memory location is up to date.

23. The processor of claim 21, wherein the access scheduler determines a first read request to serve according to the size of the bank queues.

24. The processor of claim 21, wherein the access scheduler schedules some write requests out of order.

25. The processor of claim 21, wherein the access scheduler schedules more reads per cycle than writes per cycle.

* * * * *

UNITED STATES PATENT AND TRADEMARK OFFICE
CERTIFICATE OF CORRECTION

PATENT NO. : 10,437,480 B2
APPLICATION NO. : 14/955966
DATED : October 8, 2019
INVENTOR(S) : Luan et al.

Page 1 of 1

It is certified that error appears in the above-identified patent and that said Letters Patent is hereby corrected as shown below:

In the Claims

In Column 16, Lines 17-18, Claim 5, delete "wherein updating the status memory comprises".

Signed and Sealed this
Twenty-sixth Day of November, 2019

Andrei Iancu
*Director of the United States Patent and Trademark Office*